US009532292B2

(12) United States Patent
Miyagawa et al.

(10) Patent No.: US 9,532,292 B2
(45) Date of Patent: *Dec. 27, 2016

(54) COMMUNICATION SYSTEM

(75) Inventors: Yusuke Miyagawa, Tokyo (JP); Takayuki Kido, Tokyo (JP); Takuo Akimoto, Tokyo (JP); Osamu Kurokawa, Tokyo (JP); Yuki Nakanishi, Tokyo (JP); Yasuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 197 days.

This patent is subject to a terminal disclaimer.

(21) Appl. No.: 14/343,353

(22) PCT Filed: Aug. 27, 2012

(86) PCT No.: PCT/JP2012/071563
§ 371 (c)(1),
(2), (4) Date: Mar. 6, 2014

(87) PCT Pub. No.: WO2013/038895
PCT Pub. Date: Mar. 21, 2013

(65) Prior Publication Data
US 2014/0219252 A1  Aug. 7, 2014

(30) Foreign Application Priority Data
Sep. 16, 2011 (JP) ................................ 2011-203628

(51) Int. Cl.
*H04W 4/00* (2009.01)
*H04W 36/38* (2009.01)
(Continued)

(52) U.S. Cl.
CPC .......... *H04W 36/38* (2013.01); *H04L 65/1003* (2013.01); *H04W 36/0033* (2013.01)

(58) Field of Classification Search
None
See application file for complete search history.

(56) References Cited

U.S. PATENT DOCUMENTS

2004/0017798 A1* 1/2004 Hurtta et al. ................. 370/352
2005/0141541 A1* 6/2005 Cuny et al. .................. 370/437
(Continued)

FOREIGN PATENT DOCUMENTS

CN  101511079 A  8/2009
EP  2079253  7/2009
(Continued)

OTHER PUBLICATIONS

3GPP, Ericsson "Inter-MME/Inter-UPE Mobility", 3GPP TSG SA WG2 Architecture—S2#53, Jun. 26-30, 2006, Lisbon, Portugal, 11 pages.
(Continued)

*Primary Examiner* — Mark Rinehart
*Assistant Examiner* — Angel Brockman
(74) *Attorney, Agent, or Firm* — Wilmer Cutler Pickering Hale and Dorr LLP

(57) ABSTRACT

When a representative service control device receives a PDP context succession request signal according to a handover communication procedure prescribed in an applicable standard, the representative service control device transmits a P-TMSI contained in the PDP context succession request signal as an address request to a database device. When the representative service control device receives address information of a service control device from the database device, the representative service control device forwards the PDP context succession request signal received from the request transmission means to the received address.

10 Claims, 24 Drawing Sheets

(51) Int. Cl.
*H04W 36/00* (2009.01)
*H04L 29/06* (2006.01)

(56) References Cited

U.S. PATENT DOCUMENTS

| | | | |
|---|---|---|---|
| 2005/0157673 A1* | 7/2005 | Verma et al. | 370/328 |
| 2009/0129342 A1 | 5/2009 | Hwang et al. | |
| 2010/0105386 A1 | 4/2010 | Guo | |
| 2010/0323700 A1 | 12/2010 | Bachmann et al. | |
| 2011/0188446 A1 | 8/2011 | Bienas et al. | |
| 2012/0077498 A1 | 3/2012 | Guo | |
| 2014/0051448 A1 | 2/2014 | Guo | |
| 2014/0213260 A1* | 7/2014 | Miyagawa et al. | 455/436 |

FOREIGN PATENT DOCUMENTS

| | | |
|---|---|---|
| EP | 2079261 | 7/2009 |
| EP | 2159972 A1 | 3/2010 |
| EP | 2213119 | 1/2014 |
| JP | 2008-271140 | 11/2008 |
| JP | 2010-252139 | 11/2010 |
| JP | 2010-283763 | 12/2010 |
| JP | 2011-504035 | 1/2011 |
| JP | 2011-509615 | 3/2011 |
| WO | WO-2009/063434 | 5/2009 |
| WO | WO-2009/087099 | 7/2009 |

OTHER PUBLICATIONS

3GPP, Samsung "TAU Procedure with ISR", 3GPP TSG SA WG2 Meeting #61, Nov. 12-16, 2007, Ljubljana, Slovenia, 9 pages.
Extended European Search Report corresponding to European Application No. 12832479.5, dated Jul. 9, 2015, 12 pages.
International Search Report Corresponding to PCT/JP2012/071563, dated Sep. 18, 2012; 2 pages.
Chinese Office Action issued in corresponding Chinese Application No. 201280045245.5, dated Oct. 9, 2016, 11 pages.

* cited by examiner

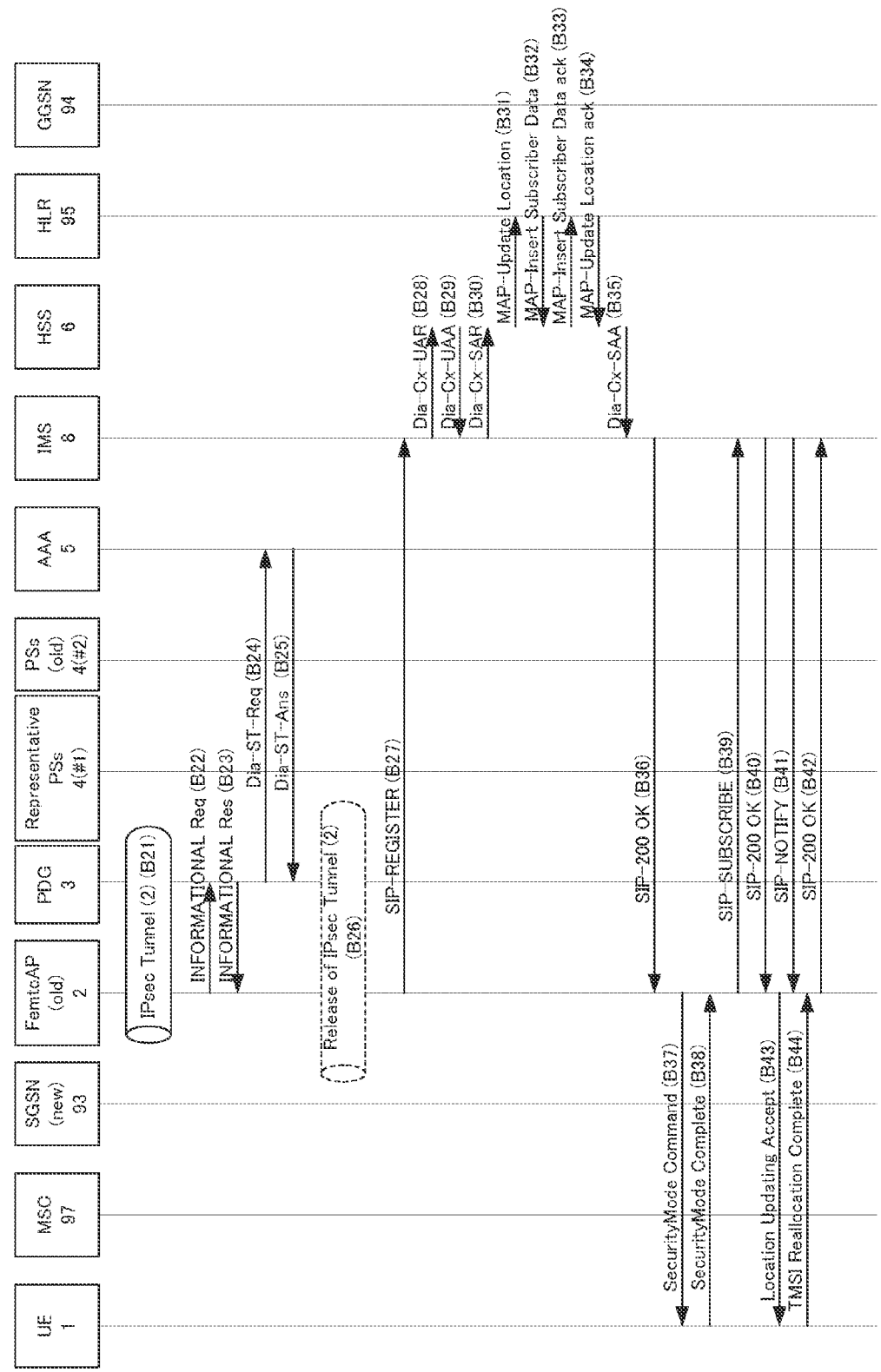

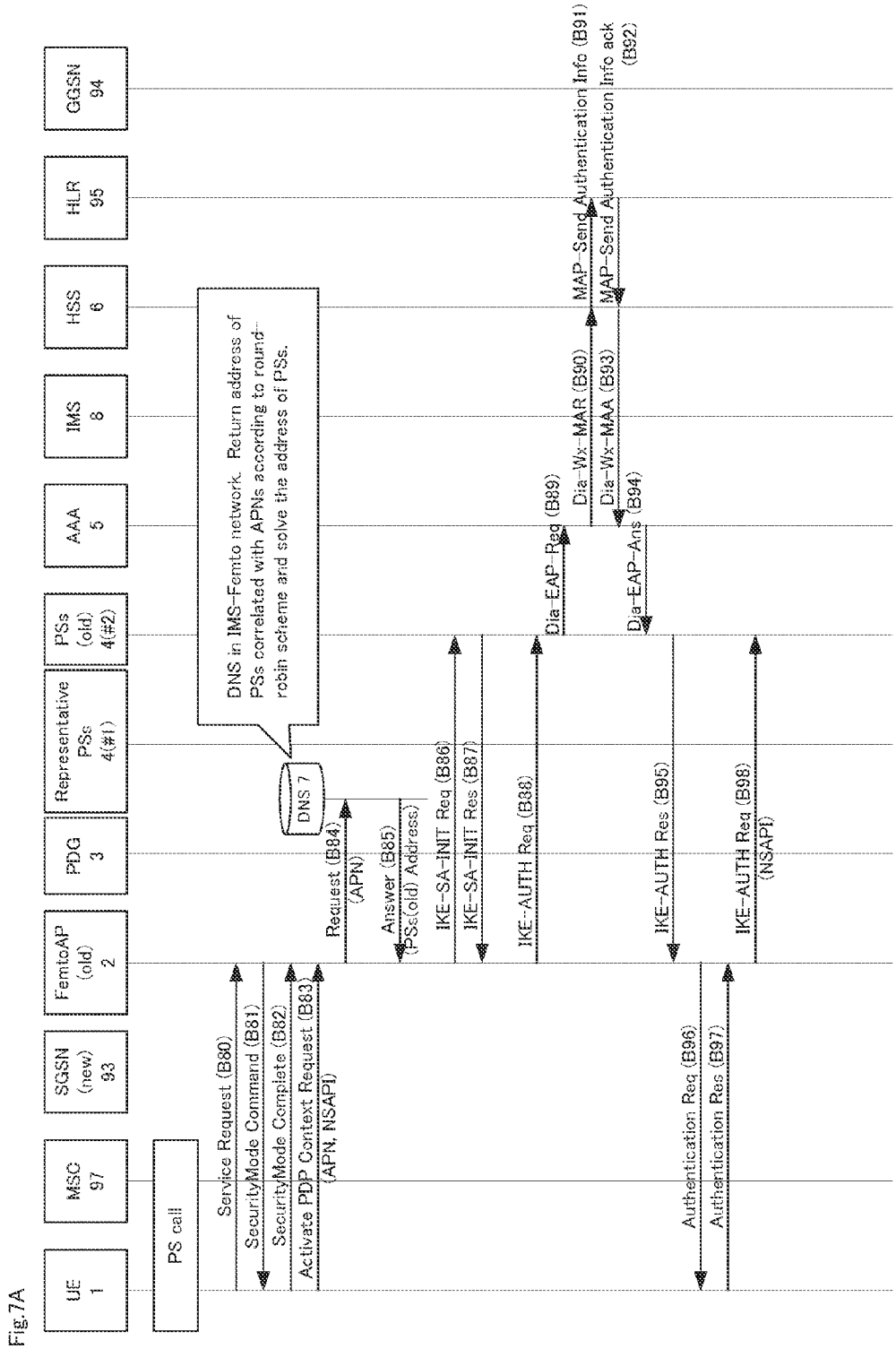

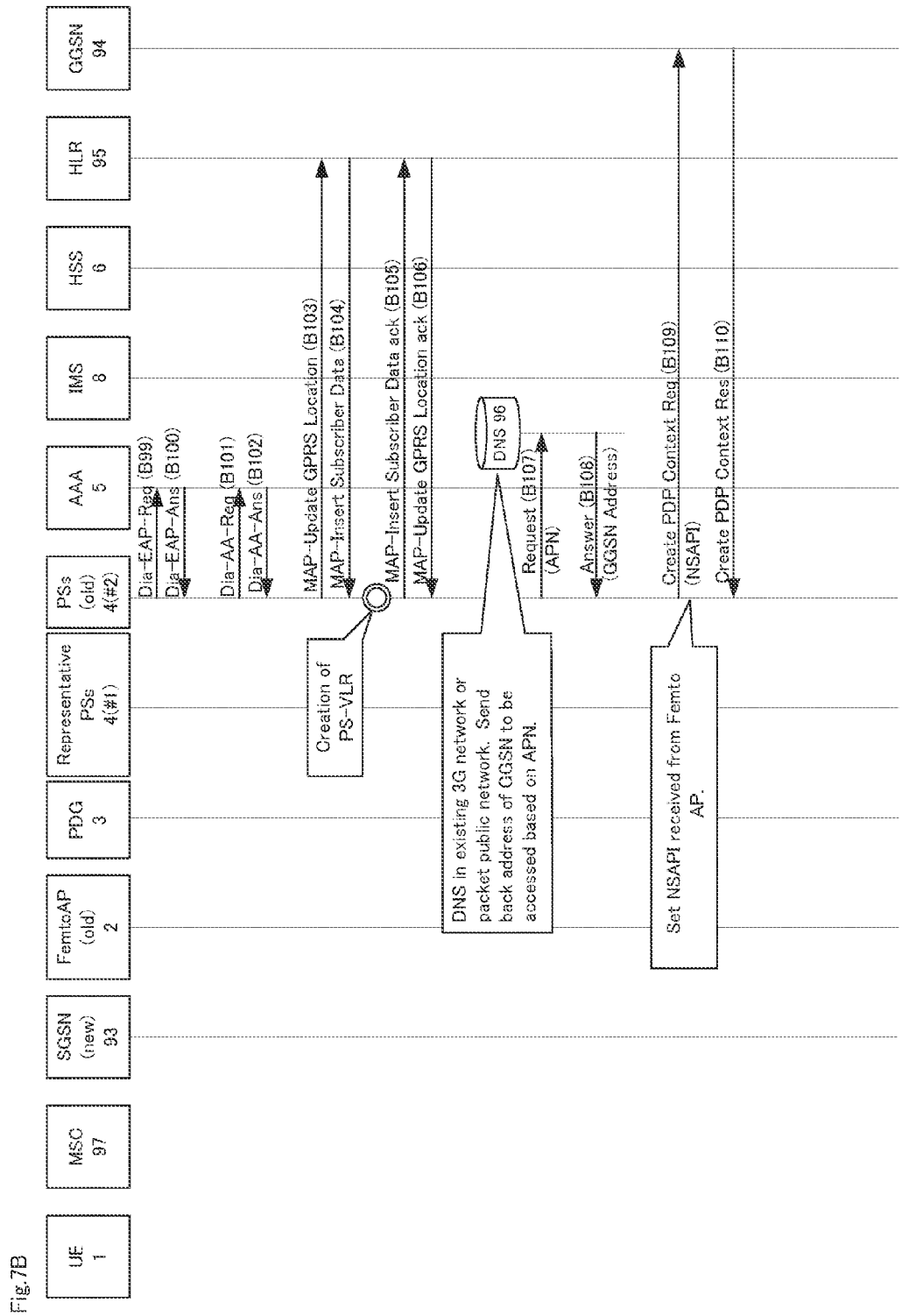

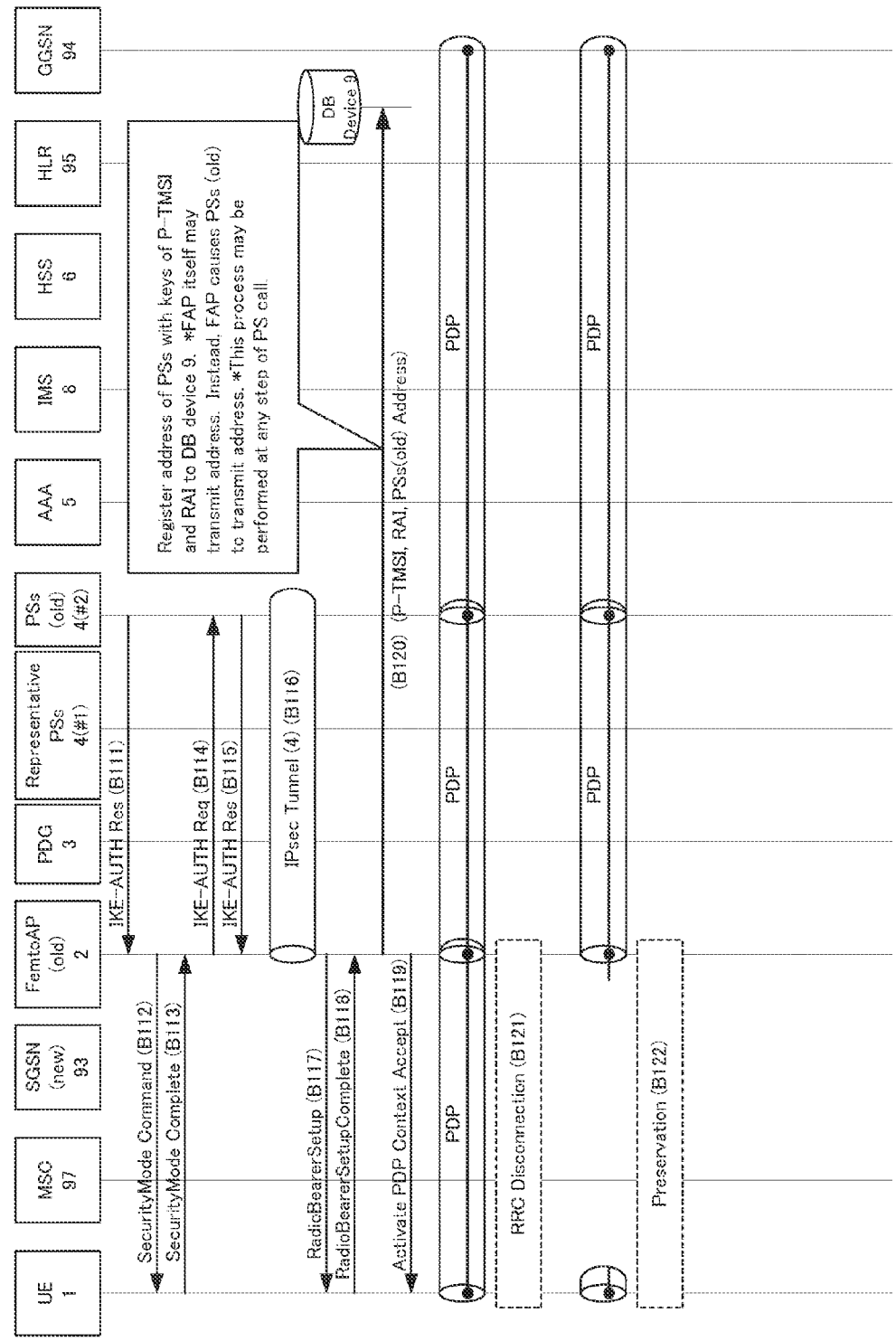

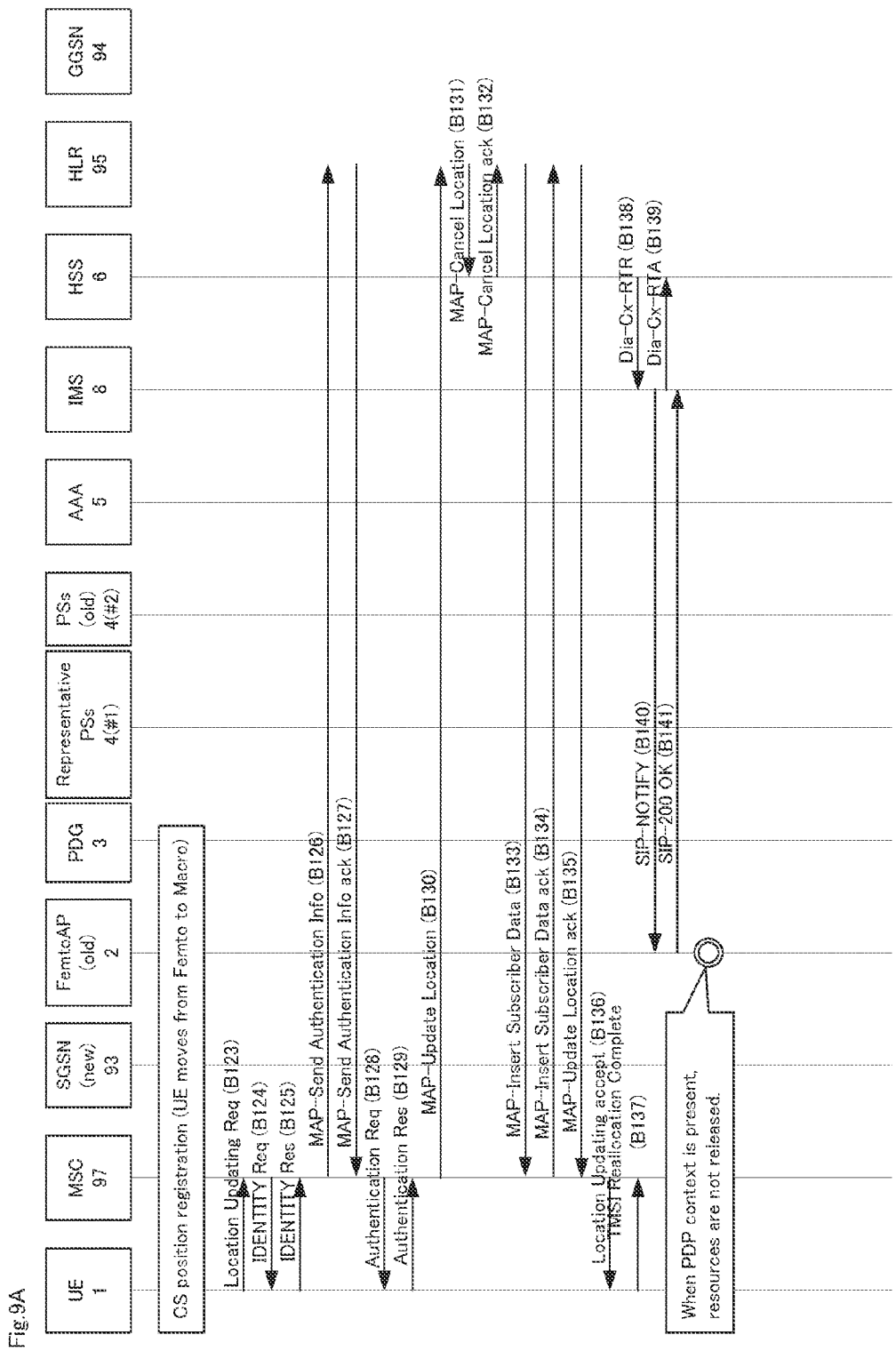

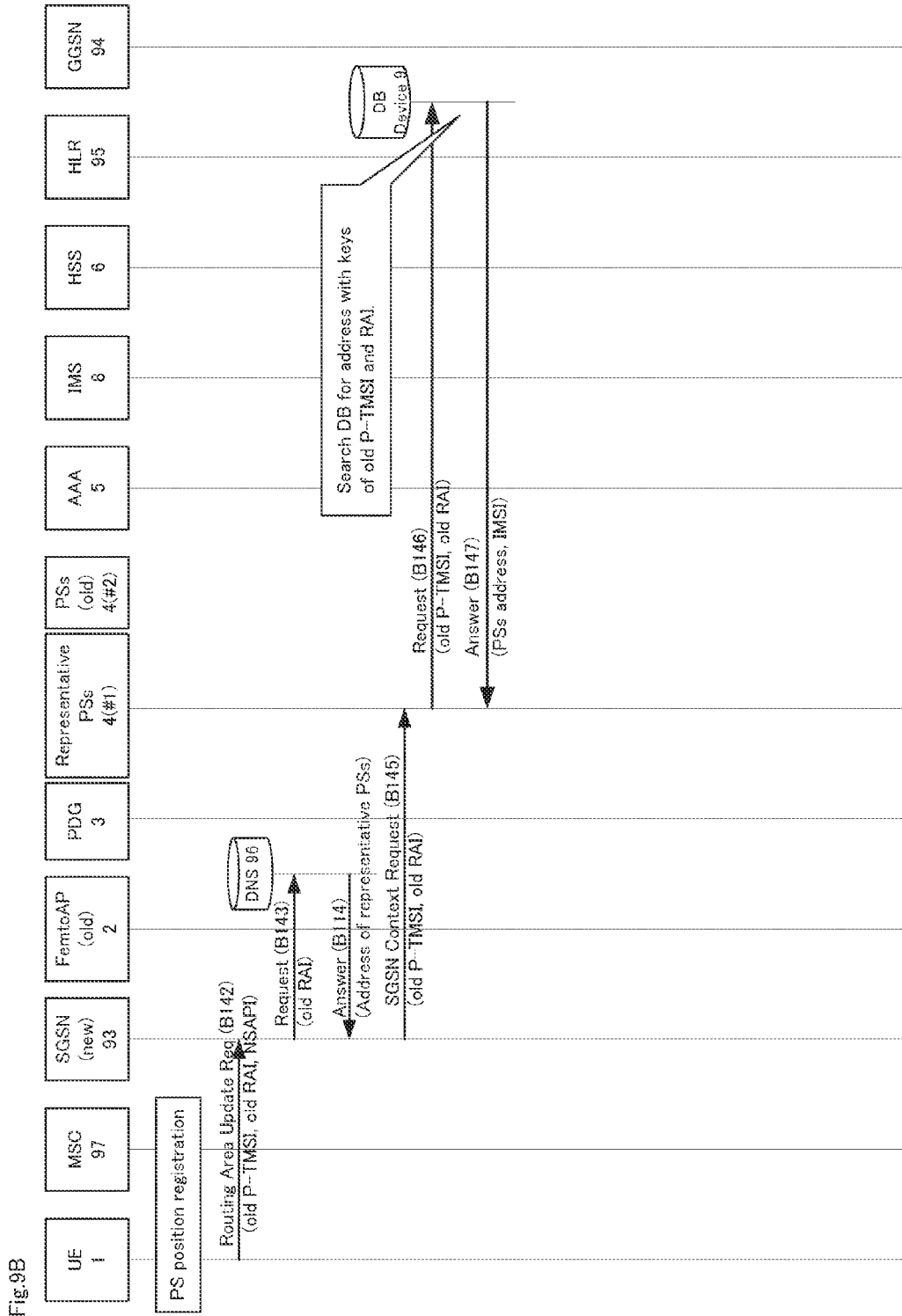

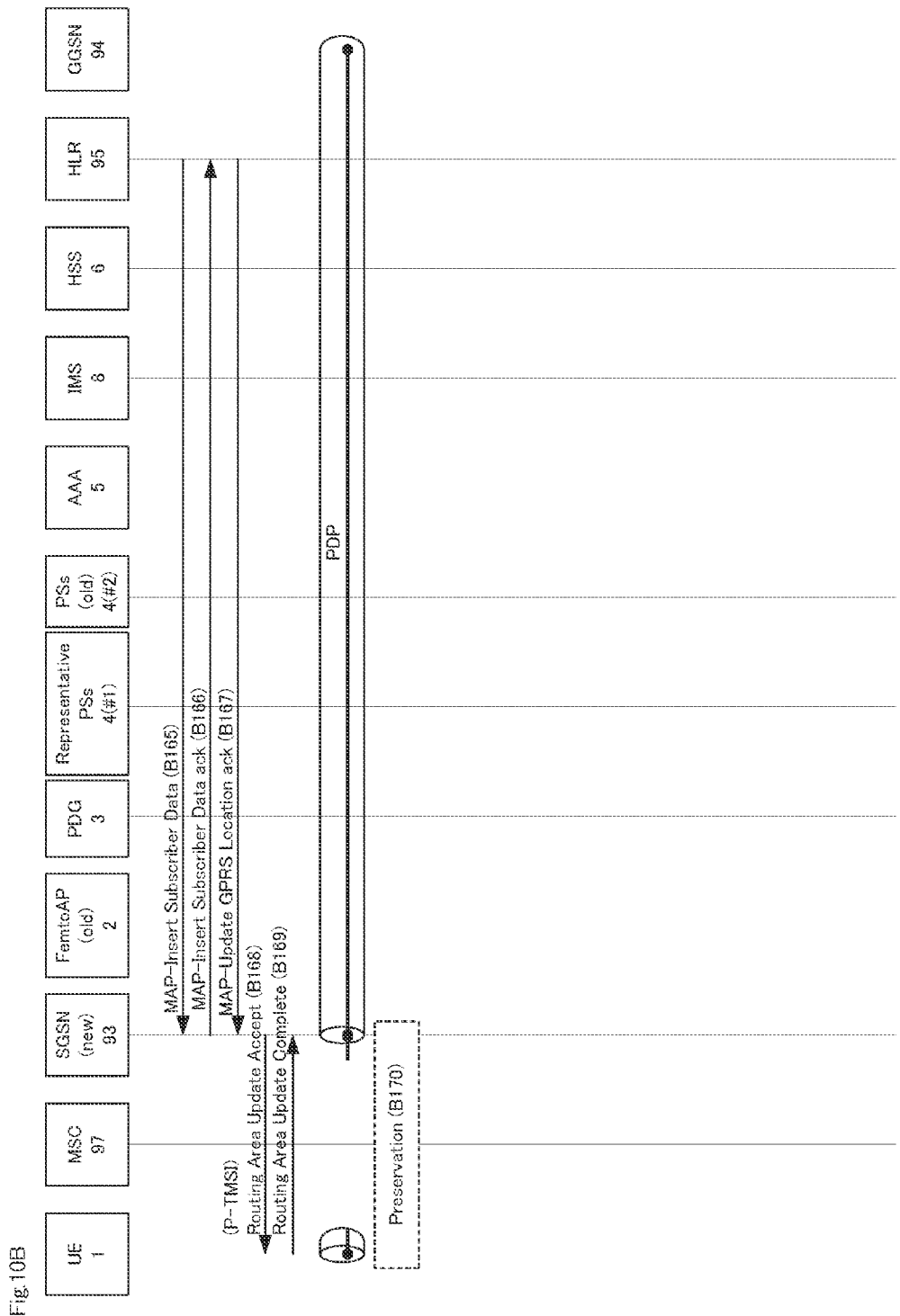

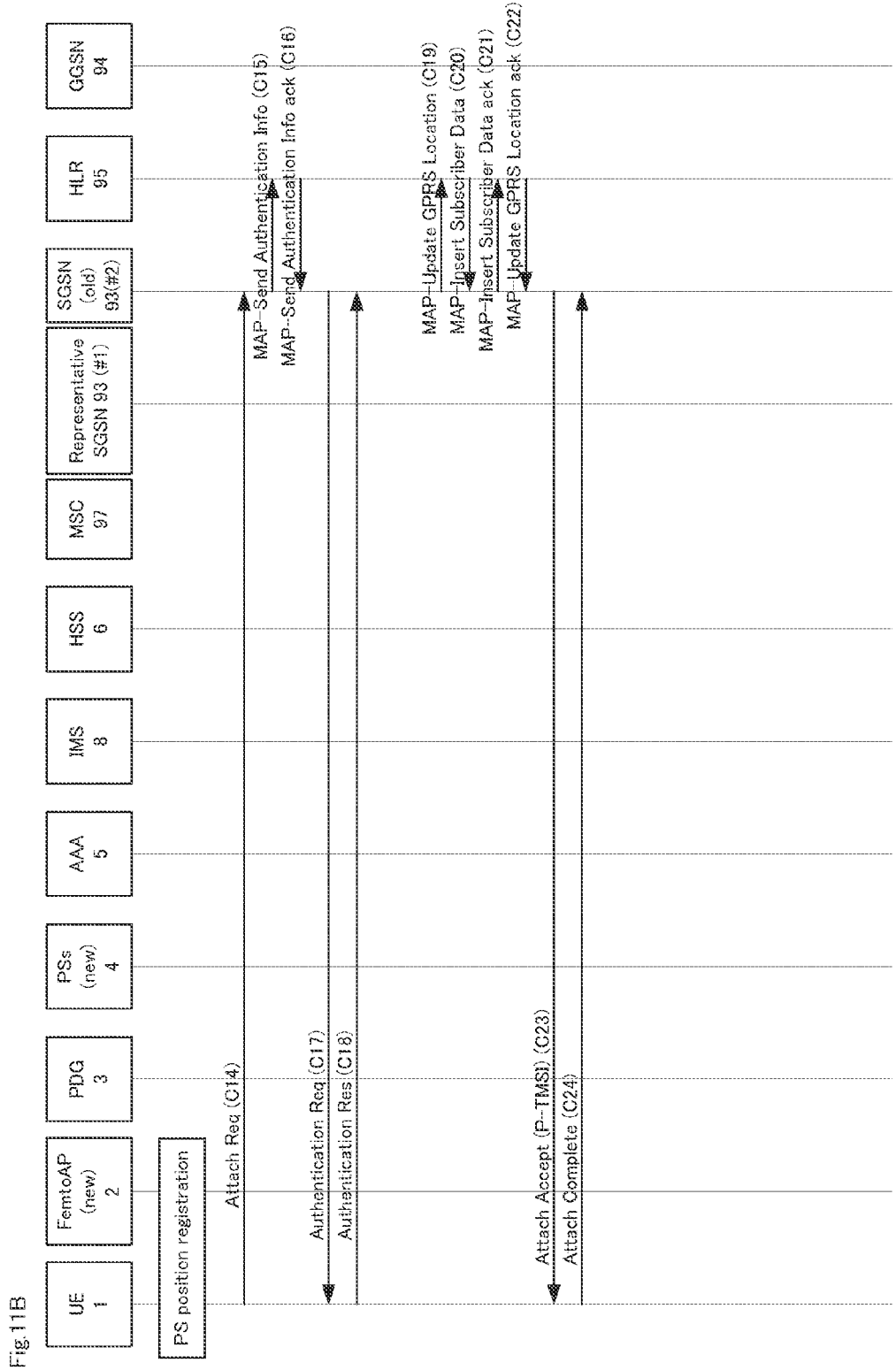

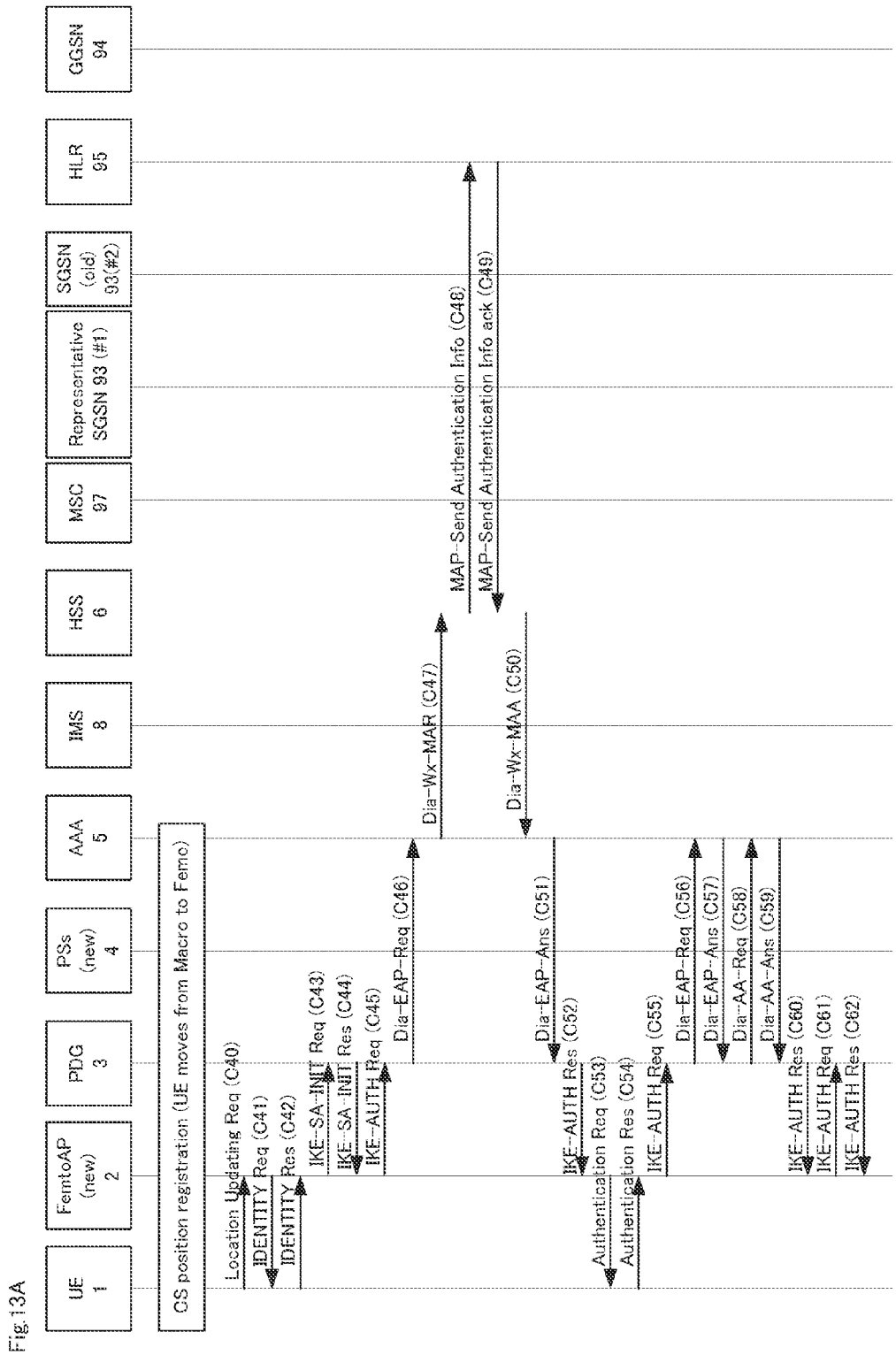

COMMUNICATION SYSTEM

CROSS-REFERENCE TO RELATED APPLICATIONS

This application is a national stage application of International Application No. PCT/JP2012/071563 entitled "Communication System," filed on Aug. 27, 2012, which claims the benefit of the priority of Japanese Patent Application No. 2011-203628, filed on Sep. 16, 2011, the disclosures of each of which are hereby incorporated by reference in their entirety.

TECHNICAL FIELD

The present invention relates to a communication system that accomplishes handover using a femtocell base station; a database device, a service control device, a femtocell base station, and a method that are used for the communication system; and programs for the service control device and the femtocell base station.

BACKGROUND ART

In the existing 3G (third generation) mobile communication network that connects calls of wireless terminals (UE: user equipment) such as mobile phones, even if a UE moves and a base station (wireless link logical node: Node B) to which the UE belongs changes to another base station, handover is performed to continue the telephone call.

With respect to the handover in the existing 3G network, the 3GPP standard (3rd Generation Partnership Project) has established various standards (for example, refer to Non-Patent Literature 1).

One related art reference discloses a system in which when a mobile terminal hands over between the existing 3G network and a wireless LAN, the mobile terminal can refer to GGSN (Gateway General Packet Radio Service Support Node) information at the handover destination coverage such that the mobile terminal can select the same GGSN as the handover source coverage (for example, refer to Patent Literature 1).

The applicant of the present patent application has disclosed a communication system that uses a femtocell base station (FAP: Femto Access Point) that connects a mobile terminal to a mobile communication core network through a wired channel of an IMS (IP Multimedia Subsystem) network installed at home, office, etc. (for example, refer to Patent Literature 2).

The communication system disclosed in Patent Literature 2 allows a mobile terminal that moves to continue a call by handover performed not only between FAPs, but also between the exiting 3G network that controls telephone calls using an MSC (Mobile Service Switching Center) and an FAP-based communication system that uses an IMS core network that controls calls.

RELATED ART LITERATURE

Patent Literature

Patent Literature 1: JP2008-271140A, Publication
Patent Literature 2: JP2010-252139A, Publication Non-Patent Literature Non-Patent Literature 1: 3GPP technical specifications TS 23.236 V5.4.0 (2005-09)

SUMMARY OF THE INVENTION

Problem to be Solved by the Invention

However, the IMS network is an architecture for a CS (Circuit Switching) service that mainly implements telephone calls and so forth. The technologies for the exiting 3G networks disclosed in the foregoing Non-Patent Literature 1 and Patent Literature 1 do not consider handover in the communication system that implements an IMS-based femtocell base station (IMS-Femto network).

Thus, PS (Packet Switching) handover for packet communication in the IMS-Femto network cannot successfully use a PDP (Packet Data Protocol) context as the logical relationship of connections of user packets that are forwarded using the PS service like handover in the existing 3G network. Thus, when PS handover is performed in the IMS-Femto network, the PDP context needs to be reactivated at the areas covered by handover destination.

On the other hand, in the system disclosed in Patent Literature 2, CS handover is performed in the IMS-Femto network to continue calls in the CS service, not successively use a PDP context at the areas covered by handover destination. Thus, the system disclosed in Patent Literature 2 cannot achieve the same PS handover as does the existing 3G network.

The present invention was made based on the foregoing point of view. An object of the present invention is to provide a communication system that realizes handover; a database device, a service control device, a femtocell base station, and a method that are used for the communication system; and programs for the service control device and the femtocell base station, each of which can realize the same PS handover as does the existing 3G network without having to modify individual devices of the existing mobile communication network.

Means that Solve the Problem

To accomplish the foregoing object, a communication system according to the present invention is a communication system that configures an IMS (IP Multimedia Subsystem) network, comprising:
a femtocell base station;
a service control device;
a core device that controls a call; and
a database device,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network,
wherein one of the plurality of service control devices has been designated as a representative service control device,
wherein the database device comprises:
storage means that correlatively stores a P-TMSI (Packet-Temporary Mobile Subscriber Identity) issued to a UE (User Equipment) and address information of a service control device that manages a femtocell base station to which the UE belongs:

search means that searches the storage means for address information correlated with the P-TMSI received from the representative service control device; and address transmission means that transmits the address information, for which the search means has searched the storage means, to the representative service control device, and wherein the service control device comprises:

request transmission means that is used as the representative service control device and transmits a P-TMSI contained in a PDP (Packet Data Protocol) context succession request signal received according to a handover communication procedure prescribed in an applicable standard as an address request to the database device; and forward control means that is used as the representative service control device and that forwards the PDP context succession request signal received by the request transmission means to an address represented by address information of the service control device received from the database device.

A database device according to the present invention is a database device used for an IMS (IP Multimedia Subsystem) network, the IMS network comprising:

a femtocell base station;
a service control device;
a core device that controls a call; and
the database device, wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network, wherein one of the plurality of service control devices has been designated as a representative service control device, and wherein the database device comprises:

storage means that correlatively stores a P-TMSI (Packet-Temporary Mobile Subscriber Identity) issued to a UE (User Equipment) and address information of a service control device that manages a femtocell base station to which the UE belongs;

search means that searches the storage means for address information correlated with the P-TMSI received from the representative service control device; and address transmission means that transmits the address information for which the search means has searched the storage means to the representative service control device.

A service control device according to the present invention is a service control device used for an IMS (IP Multimedia Subsystem) network, the IMS network comprising:

a femtocell base station;
the service control device;
a core device that controls a call; and
a database device, wherein the service control device has an SGSN (Serving GPRS Support Node) function section, the SGSN function section sends back a signal transmitted from a network that uses a communication procedure different from that of the IMS network in the same manner as a signal transmitted from an SGSN, a plurality of service control devices being provided in the IMS network, wherein one of the plurality of service control devices has been designated as a representative service control device, wherein the database device comprises:

storage means that correlatively stores a P-TMSI (Packet-Temporary Mobile Subscriber Identity) issued to a UE (User Equipment) and address information of a service control device that manages a femtocell base station to which the UE belongs;

search means that searches the storage means for address information correlated with the P-TMSI received from the representative service control device; and address transmission means that transmits the address information for which the search means has searched the storage means to the representative service control device, and wherein the service control device comprises:

request transmission means that is used as the representative service control device and transmits a P-TMSI contained in a PDP (Packet Data Protocol) context succession request signal received according to a handover communication procedure prescribed in an applicable standard as an address request to the database device; and forward control means that is used as the representative service control device and that forwards the PDP context succession request signal received by the request transmission means to an address represented by address information of the service control device received from the database device.

A femtocell base station according to the present invention is a femtocell base station used for an IMS (IP Multimedia Subsystem) network, the IMS network comprising:

the femtocell base station;
a service control device;
a core device that controls a call; and
a database device, wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network, wherein one of the plurality of service control devices has been designated as a representative service control device, wherein the database device comprises:

storage means that correlatively stores a P-TMSI (Packet-Temporary Mobile Subscriber Identity) issued to a UE (User Equipment) and address information of a service control device that manages a femtocell base station to which the UE belongs;

search means that searches the storage means for address information correlated with the P-TMSI received from the representative service control device; and address transmission means that transmits the address information for which the search means has searched the storage means to the representative service control device, and wherein the femtocell base station comprises:

issuance means that issues a P-TMSI to the UE;

second registration request means that transmits the P-TMSI issued by the issuance means and the received address information of the service control device that manages its own femtocell base station as a registration request to the database device.

A communication method according to the present invention is a communication method for a communication system that configures an IMS (IP Multimedia Subsystem) network, wherein the IMS network comprises:
a femtocell base station;
a service control device;
a core device that controls a call; and
a database device,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network,
wherein one of the plurality of service control devices has been designated as a representative service control device,
wherein the communication method comprises:
a storage step that correlatively stores a P-TMSI (Packet-Temporary Mobile Subscriber Identity) issued to a UE (User Equipment) and address information of a service control device that manages a femtocell base station to which the UE belongs;
a request transmission step that transmits a P-TMSI contained in a PDP (Packet Data Protocol) context succession request signal received by the representative service control device according to a handover communication procedure prescribed in an applicable standard as an address request to the database device;
a search step that searches the database device for address information correlated with the P-TMSI that the database device receives from the representative service control device;
an address transmission step that causes the database device to transmit the address information for which the search means has searched the storage means at the search step to the representative service control device; and
a forward control step that forwards the PDP context succession request signal received by the representative service control device at the request transmission step to an address represented by address information of the service control device received from the database device.

A program for a database device according to the present invention is a program for a database device used for an IMS (IP Multimedia Subsystem) network, the IMS network comprising:
a femtocell base station;
a service control device;
a core device that controls a call; and
the database device,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network,
wherein one of the plurality of service control devices has been designated as a representative service control device, and
wherein the program causes a computer of the database device to execute processes comprising:
a storage process that correlatively stores a P-TMSI (Packet-Temporary Mobile Subscriber Identity) issued to a UE (User Equipment) and address information of a service control device that manages a femtocell base station to which the UE belongs;
a search process that searches the database device for the address information that is stored at the storage process and that is correlated with the P-TMSI received from the representative service control device; and
an address transmission process that transmits the address information for which the search means has searched the database device to the representative service control device.

A program for a service control device according to the present invention is a program for a service control device used for an IMS (IP Multimedia Subsystem) network, the IMS network comprising:
a femtocell base station;
the service control device;
a core device that controls a call; and
a database device,
wherein a plurality of service control devices are provided in the IMS network,
wherein one of the plurality of service control devices has been designated as a representative service control device,
wherein the database device correlatively stores a P-TMSI (Packet-Temporary Mobile Subscriber Identity) issued to a UE (User Equipment) and address information of a service control device that manages a femtocell base station to which the UE belongs, searches the database device for address information correlated with the P-TMSI and received from the representative service control device, and transmits the address information to the representative service control device,
wherein a computer of the service control device is caused to operate as an SGSN (Serving GPRS Support Node) function section that sends back a signal transmitted from a network that uses a communication procedure different from that of the IMS network in the same manner as a signal transmitted from an SGSN, and
wherein the program causes the computer of the service control device to execute processes comprising:
a request transmission process that operates as the representative service control device and transmits the P-TMSI contained in a PDP (Packet Data Protocol) context succession request signal received according to a handover communication procedure prescribed in an applicable standard as an address request to the database device; and
a forward control process that operates as the representative service control device and that forwards the PDP context succession request signal received by the request transmission process to an address represented by address information of the service control device received from the database device.

A program for a femtocell base station according to the present invention is a program for a femtocell base station used for an IMS (IP Multimedia Subsystem) network, the IMS network comprising:
the femtocell base station;
a service control device;
a core device that controls a call; and
a database device,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network,
wherein one of the plurality of service control devices has been designated as a representative service control device,
wherein the database device correlatively stores a P-TMSI (Packet-Temporary Mobile Subscriber Identity) issued to a UE (User Equipment) and address information of a service control device that manages a femtocell base station to which the UE belongs, searches the database device for address information that is stored at the storage process and that is correlated with the P-TMSI and received from the representative service control device, and transmits the obtained address information to the representative service control device, and wherein the program causes a computer of the femtocell base station to execute the processes comprising:

an issuance process that issues a P-TMSI to the UE; and a second registration request process that transmits the P-TMSI issued by the issuance means and the received address information of the service control device that manages its own femtocell base station as a registration request to the database device.

Effect of the Invention

As described above, according to the present invention, PS handover can be realized in the IMS-Femto network in the same manner as PS handover performed in the existing 3G network without having to modify individual devices of the existing mobile communication network such as the existing 3G network.

BRIEF DESCRIPTION OF DRAWINGS

FIG. 5B is a first part of a sequence diagram showing an example of a PS handover operation performed from the IMS-Femto network to the existing 3G network.

FIG. 7A is a third part of a sequence diagram showing an example of a PS handover operation performed from the IMS-Femto network to the existing 3G network.

FIG. 7B is a third part of a sequence diagram showing an example of a PS handover operation performed from the IMS-Femto network to the existing 3G network.

FIG. 8 is a fourth part of a sequence diagram showing an example of a PS handover operation performed from the IMS-Femto network to the existing 3G network.

FIG. 9A is a fifth part of a sequence diagram showing an example of a PS handover operation performed from the IMS-Femto network to the existing 3G network.

FIG. 9B is a fifth part of a sequence diagram showing an example of a PS handover operation performed from the IMS-Femto network to the existing 3G network.

FIG. 10B is a sixth part of a sequence diagram showing an example of a PS handover operation performed from the IMS-Femto network to the existing 3G network.

FIG. 11B is a first part of a sequence diagram showing an example of a PS handover operation performed from the existing 3G network to the IMS-Femto network.

FIG. 13A is a third part of a sequence diagram showing an example of a PS handover operation performed from the existing 3G network to the IMS-Femto network.

BEST MODES THAT CARRY OUT THE INVENTION

Next, with reference to the accompanying drawings, a communication system, a database device, a service control device, a femtocell base station, a communication method, and programs will be described in details.

First, with reference to FIG. 1, an outline of an embodiment of the present invention will be described.

The IMS-Femto network according to this embodiment allows femtocell base station (FPA: Femto Access Point) to connect a telephone call of a UE that is a wireless terminal and to handover the call to an existing network as prescribed in the applicable standards such as the 3GPP standard without having to change the existing public mobile communication network.

In addition, the IMS-Femto network according to this embodiment successively uses a PDP context when PS handover is performed. Thus, even PS handover can be performed between the IMS-Femto network according to this embodiment and the existing mobile communication network such as the existing 3G network in the same manner as that performed in the existing 3G network. Thus, even if handover is performed while packets are being transmitted or in the preservation state that occurs because no packet transmission state continues for a predetermined time, the packet communication can be continued in the same manner in which PS handover is performed in the existing 3G network.

<Example of Configuration of Communication System>

Next, a configuration of the communication system according to this embodiment will be described in detail.

Figure 1:
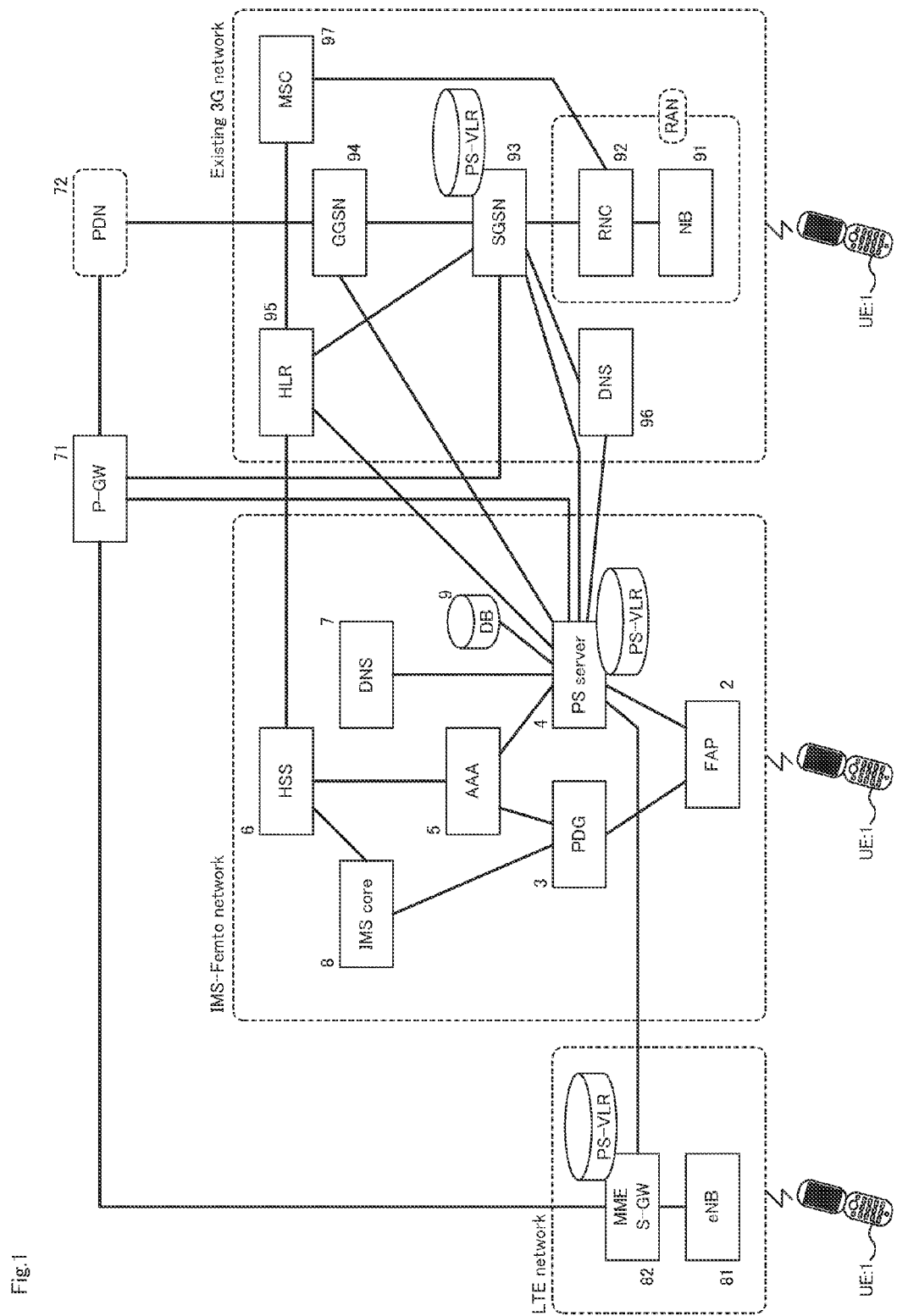
FIG. 1 is a block diagram showing an example of a configuration of a communication system according to an embodiment of the present invention.

As shown in FIG. 1, the communication system according to this embodiment has an existing 3G network (macro network), an IMS-Femto network, and an LTE (Long Term Evolution) network that are connected to various types of public data networks (PDNs) through respective P-GWs (PDN Gateways).

The existing 3G network is an existing mobile communication network that provides a 3G service and has SGSN (Serving GPRS Support Node) 93, GGSN (Gateway GPRS Support Node) 94, HLR (Home Location Register) 95, DNS (Domain Name Server) 96, MSC (Mobile Services Switching Center) 97, and an RAN (Radio Area Network). The RAN has RNC (Radio Network Controller) 92 and NB (Node B) 91. Node B 91 accommodates UE 1 as a subordinate member.

UE 1, Node B 91, RNC 92, SGSN 93, GGSN 94, HLR 95, DNS 96, MSC 97 that configures the existing 3G network are devices that perform processes based on the 3GPP standard. Description of specific processes and operations of these devices will be omitted. Technologies used in the existing 3G network are disclosed, for example, in the foregoing Non-Patent Literature 1, 3GPP TS 33.234 V8.0.0 (2007-12), and so forth.

The LTE network has eNB (eNode B) 81, MME (Mobility Management Entity), S-GW (Serving Gateway) 82, and so forth. eNB 81 accommodates UE 1 as a subordinate member. Individual devices that configure the LTE network are those that perform processes based on the 3GPP standard such as 3GPP TS 23.401 V9.0.0 (2009.3). Their specific processes and operations will be omitted.

The IMS-Femto network forms a predetermined communication coverage and has FAP 2, PDG 3, PS server 4, AAA (Authentication Authorization Accounting) 5, HSS (Home Subscriber Server) 6, DNS 7, IMS core 8, and DB (Database) device 9. FAP 2 accommodates UE 1 as a subordinate member.

FAP 2 is a small wireless base station that has a narrow communication coverage with a radius of around several ten meters.

PDG 3 is a device that relays messages.

PS server (service control device) 4 implements an SGSN function section that transmits and receives signals to and from individual devices of another network such as the existing 3G network in the same manner as does SGSN 93 of the existing 3G network and causes individual devices of the other networks to virtually recognize itself as an SGSN. In addition, PS server 4 obtains a PS subscriber profile from HLR 95, correlates it with an IMSI_UE, and stores the correlated data as a PS-VLR (Visitor Location Register) so as to manage a PS subscriber profile of each UE connected to the Femto IMS network.

Figure 2:
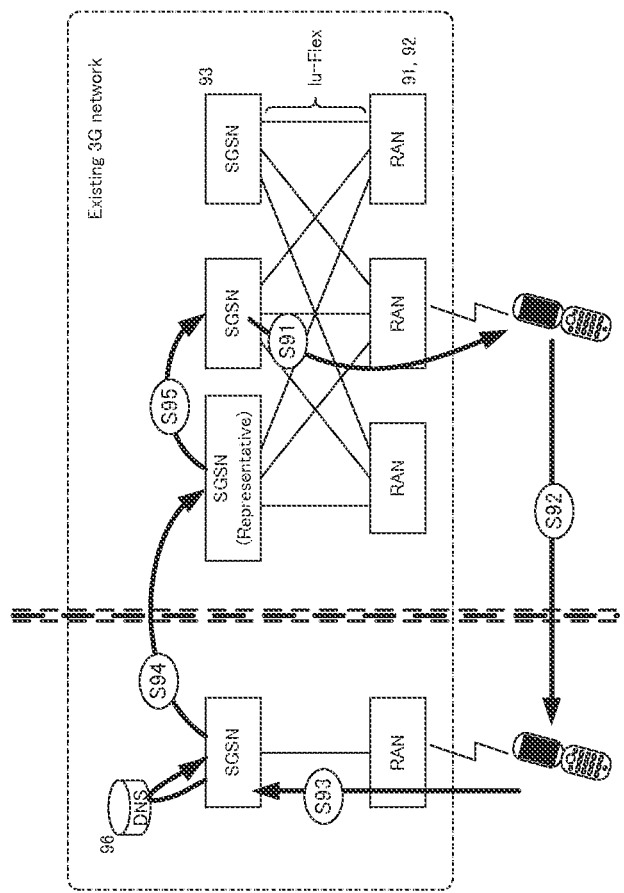
FIG. 2 is a schematic diagram showing an outline of PS handover performed in the existing 3G network.

In addition, as shown in FIG. 2, it is assumed that a plurality of similar SGSNs are provided in the existing 3G network and one of them has been designated as a representative SGSN.

Figure 3:
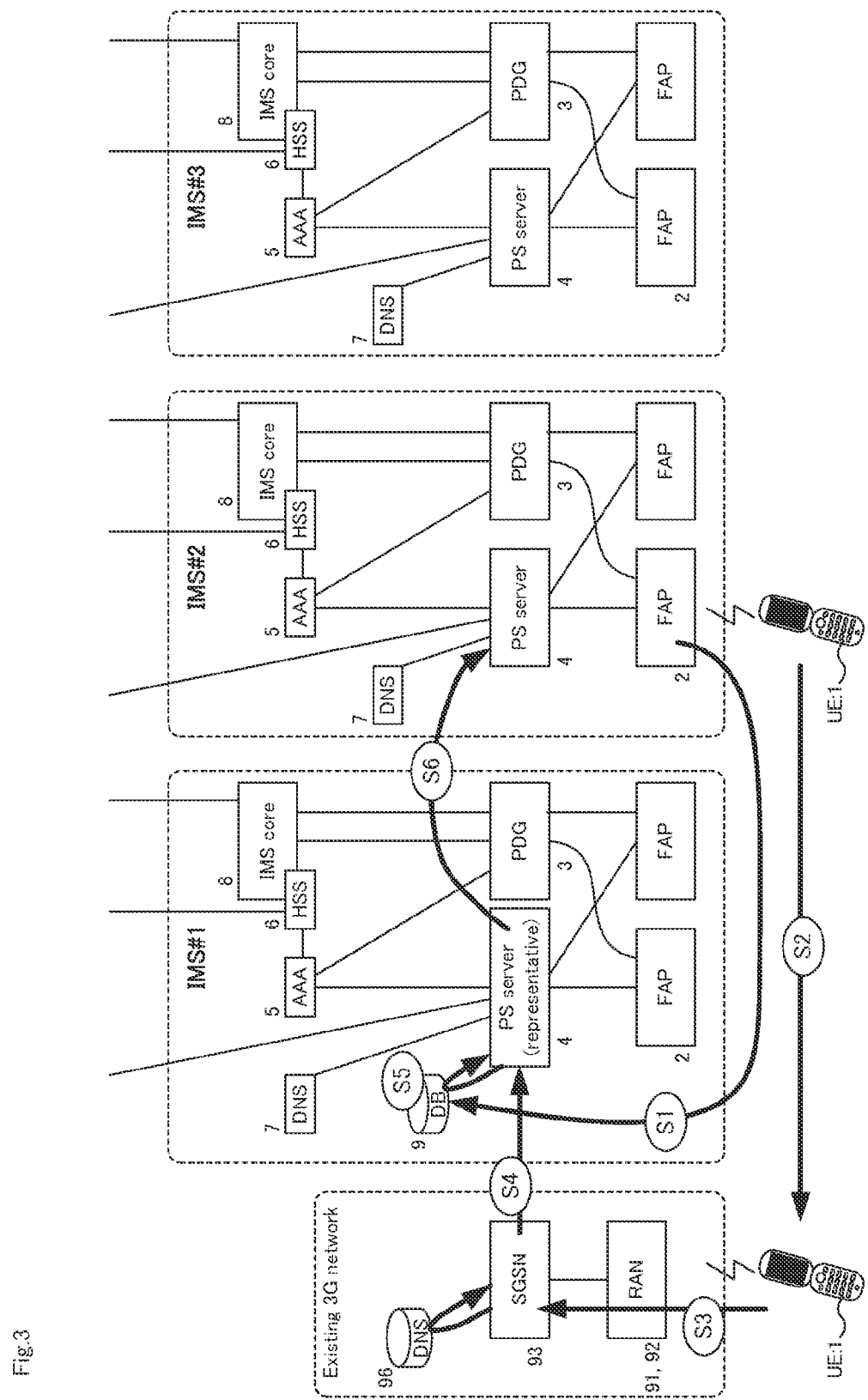
FIG. 3 is a schematic diagram describing an outline of PS handover performed between the IMS-Femto network according to the embodiment and the existing 3G network.

Moreover, as shown in FIG. 3, it is assumed that a plurality of similar PS servers are provided and one of them has been designated as a representative PS server.

Likewise, it is assumed that a plurality of similar LTE networks are provided.

When the representative PS server receives a signal to be forwarded to a handover source PS server, the representative PS server sends an inquiry to DB device 9, that will be described later, about address information of the handover source PS server and forwards the received signal to the address that DB device 9 sends back.

AAA 5 is a device that performs an authentication process and so forth for UE 1.

HSS 6 obtains a CS subscriber profile from HLR 95 and stores it as a CS-VLR so as to manage the CS subscriber profile and so forth of UE 1.

DNS 7 of the IMS-Femto network is a DNS provided to inquire about address information in the IMS-Femto network. Thus, DNS 7 has stored address information of each PS server 4 of the IMS-Femto network. If DNS 7 receives an address request for a PS server along with an APN from FAP 2, DNS 7 sequentially sends back address information of the PS server to FAP 2 according to the round robin scheme. Thus. DNS 7 can allocate address information of a PS server to the inquiring FAP.

Likewise, DNS 7 of the IMS-Femto network has stored address information of each PDG 3 of the IMS-Femto network. When DNS 7 receives an address request of a PDG along with an APN from FAP 2, DNS 7 sequentially sends back the address information of the PDG according to the round robin scheme. Thus, FAP 2 can allocate address information of PDG to an inquiring FAP.

IMS core 8 is a core network that includes a core device such as a call state control server (CSCF: Call Session Control Function) that performs a session control and so forth. UE 1 causes IMS core 8 to perform a position registration process through FAP 2 and PDG 3. IMS core 8 implements a call control function and so forth for each UE that belongs to FAP 2.

DB device 9 receives as registration information a set of a P-TMSI (Packet-Temporary Mobile Subscriber Identity) issued to a UE, an RAI (Routing Area Identity) of an FAP to which the UA belongs, an IMSI of the UE, and address information of a PS server that manages the FAP to which the UE belongs, correlates the P-TMSI, RAI, IMSI_UE, and address information of the PS server, and store the correlated data as a database.

Thus, when DB device 9 receives an inquiry about address information of the PS server, DB device 9 searches its own database for address information with keys of the received P-TMSI and RAI received along with the inquiry and sends back the address information correlated with the P-TMSI and RAI to the inquiring source.

An RAI is information prescribed in the 3GPP standard. An RAI is uniquely allocated to each FAP. Thus, an RAI registered to DB device 9 serves to be identification information with which an FAP to which a UE belongs is identified.

<Outline of PS Handover Operation (in Existing 3G Network)>

Next, an outline of a PS handover operation in the communication system according to this embodiment will be described.

First, with reference to FIG. 2, an outline of an operation that identifies an SGSN that manages a PS handover source Node B in the existing 3G network will be described so as to help understand an operation that features this embodiment. The PS handover operation performed in the existing 3G network is a technique that has been standardized in 3GPP TS 23.236.

When the PS position of UE 1 is registered, the SGSN transmits a P-TMSI containing identification information of its own SGSN (NRI: Node Resource Indicator) (at step S91).

After a PS call is established, when an event in which the end user who has UE 1 moves from one coverage to another coverage occurs, handover is started (at step S92). As a result, an Inter-RAU (Routing Area Update) is started (at step S93).

With the Iu-Flex function prescribed in the 3GPP technical specifications, the handover destination SGSN cannot find the address of the handover source SGSN based on an RAT (Routing Area Identity) transmitted from UE 1. Thus, a GTP (GPRS Tunneling Protocol) signal is forwarded to the representative SGSN (at step S94).

The representative SGSN determines an SGSN identified with the NRI contained in the P-TMSI as the handover source SGSN and forwards the received GTP signal to the identified handover source SGSN (at step S95).

<Outline of PS Handover Operation <from IMS-Femto Network to Existing 3G Network>

Next, with reference to FIG. 3, an outline of an operation that identifies a PS server that manages a handover source FAP in the case in which UE 1 hands over a call from an FAP of the IMS-Femto network to a Node B of the existing 3G network will be described.

When UE 1 performs a PS call, FAP 2 communicates with a PS server that manages its own FAP 2 and transmits a set of the P-TMSI issued to the UE, the RAI of its own FAP 2, the IMSI of the UE, and the address information of the PS server that manages its own FAP 2 to DB device 9 so as to register the set of information to the database of DB device 9 (at step S1).

After the PS call is established, when an event in which the end user who has UE 1 moves from one coverage to another coverage occurs, handover is started (at step S2). As a result, the Inter-RAU (Routing Area Update) is started in the existing 3G network as the handover destination (at step S3).

As in the operation in the foregoing existing 3G network at step S94 shown in FIG. 2, since SGSN 93 of the existing 3G network cannot find the address of the handover source SGSN, SGSN 93 of the existing 3G network forwards the GTP signal to the representative PS server (at step S4).

The representative PS server transmits the inquiry about address information of the handover source PS server containing the P-TMSI and RAI contained in the received GTP signal to DB device 9. DB device 9 searches its own database for the address information with keys of the P-TMSI and RAI received along with the inquiry and sends back address information correlated with the P-TMSI and RAI to the representative PS server (at step S5).

When the representative PS server receives the address information of the handover source PS server from DB device 9, the representative PS server forwards the received GTP signal to the address of the handover source PS server (at step S6).

As described above, the IMS-Femto network according to this embodiment allows the address of the handover source PS server to be identified without having to modify individual devices of the existing mobile communication network such as the existing 3G network. Thus, PS handover can be implemented between the IMS-Femto network and the existing mobile communication network such as the existing 3G network in the same manner as that performed in the existing 3G network.

<Example of Operation of Communication System>

Next, the operation of the SGSN function section and the PS handover operation of a PS server in the communication system according to this embodiment will be described in comparison with those prescribed in the 3GPP standard and so forth.

<Example of PS Handover Operation Between SGSNs of Existing 3G Network>

Figure 4:
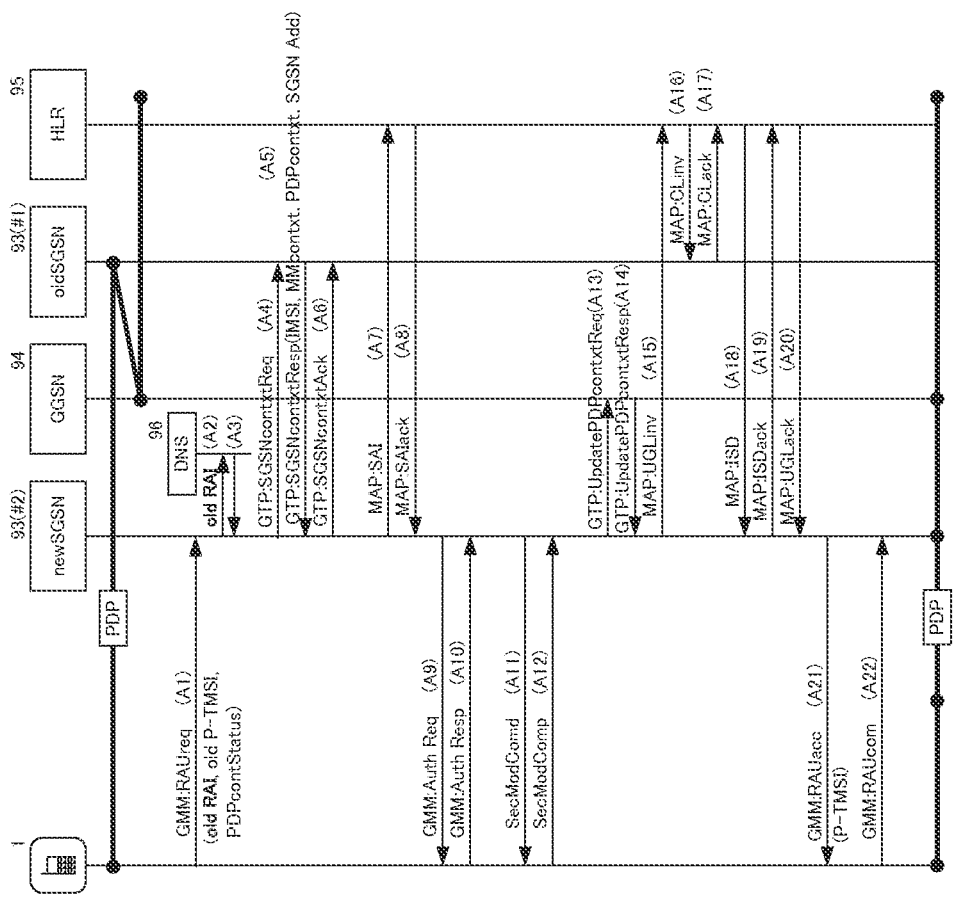
FIG. 4 is a sequence diagram showing an example of a PS handover operation performed between SGSNs of the existing 3G network.
Figure 5A:
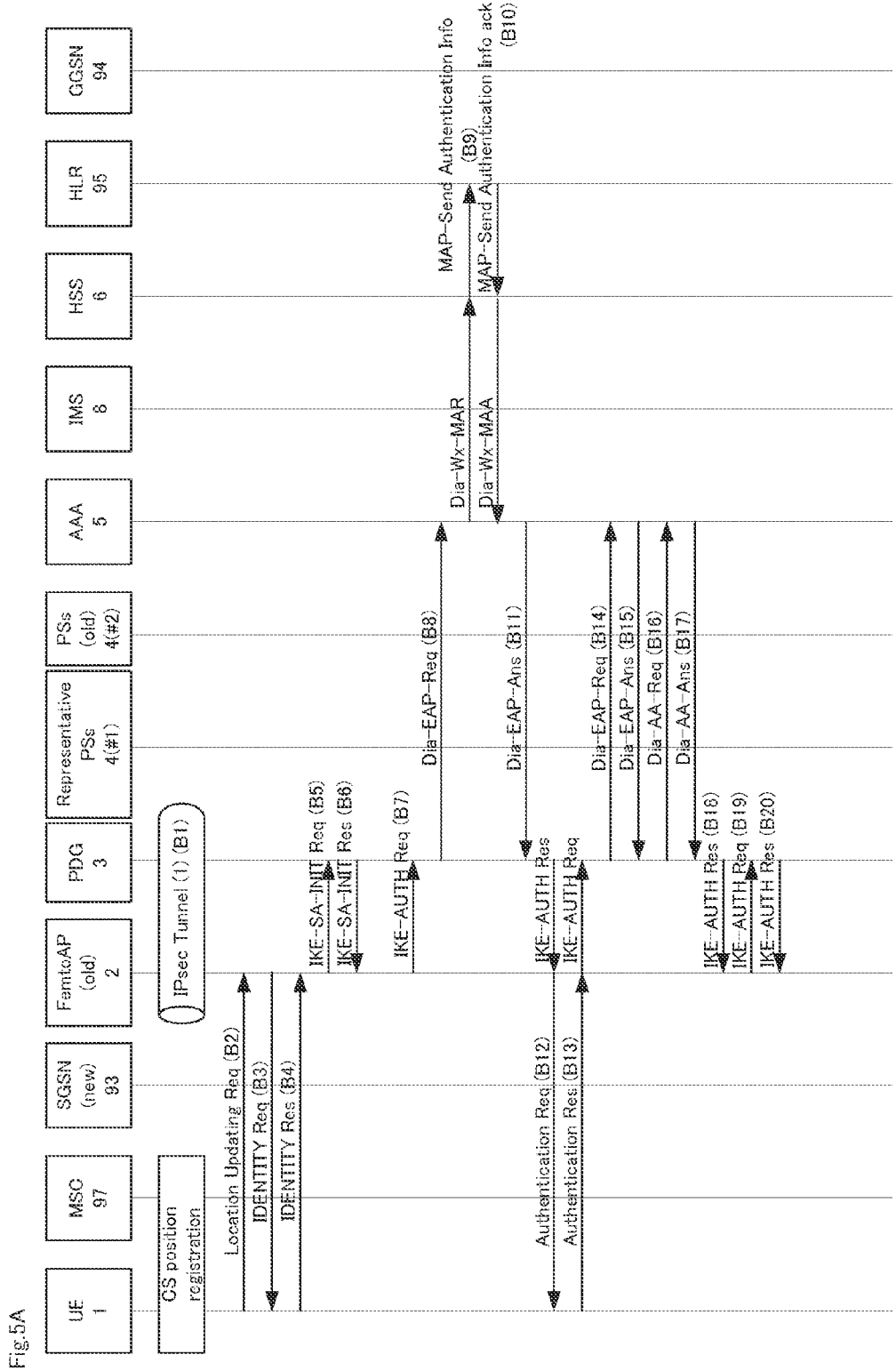
FIG. 5A is a first part of a sequence diagram showing an example of a PS handover operation performed from the IMS-Femto network to the existing 3G network.
Figure 6A:
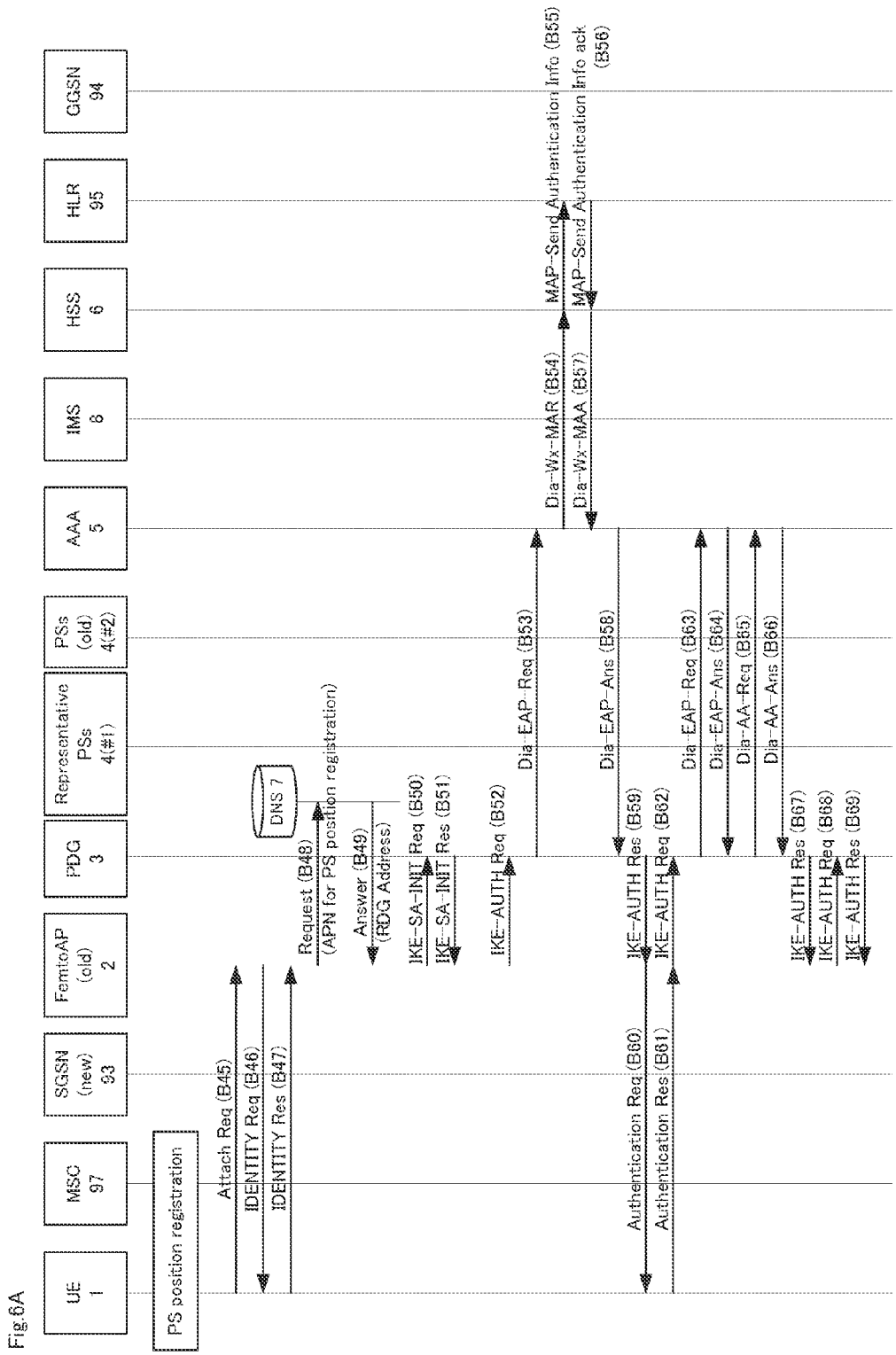
FIG. 6A is a second part of a sequence diagram showing an example of a PS handover operation performed from the IMS-Femto network to the existing 3G network.
Figure 6B:
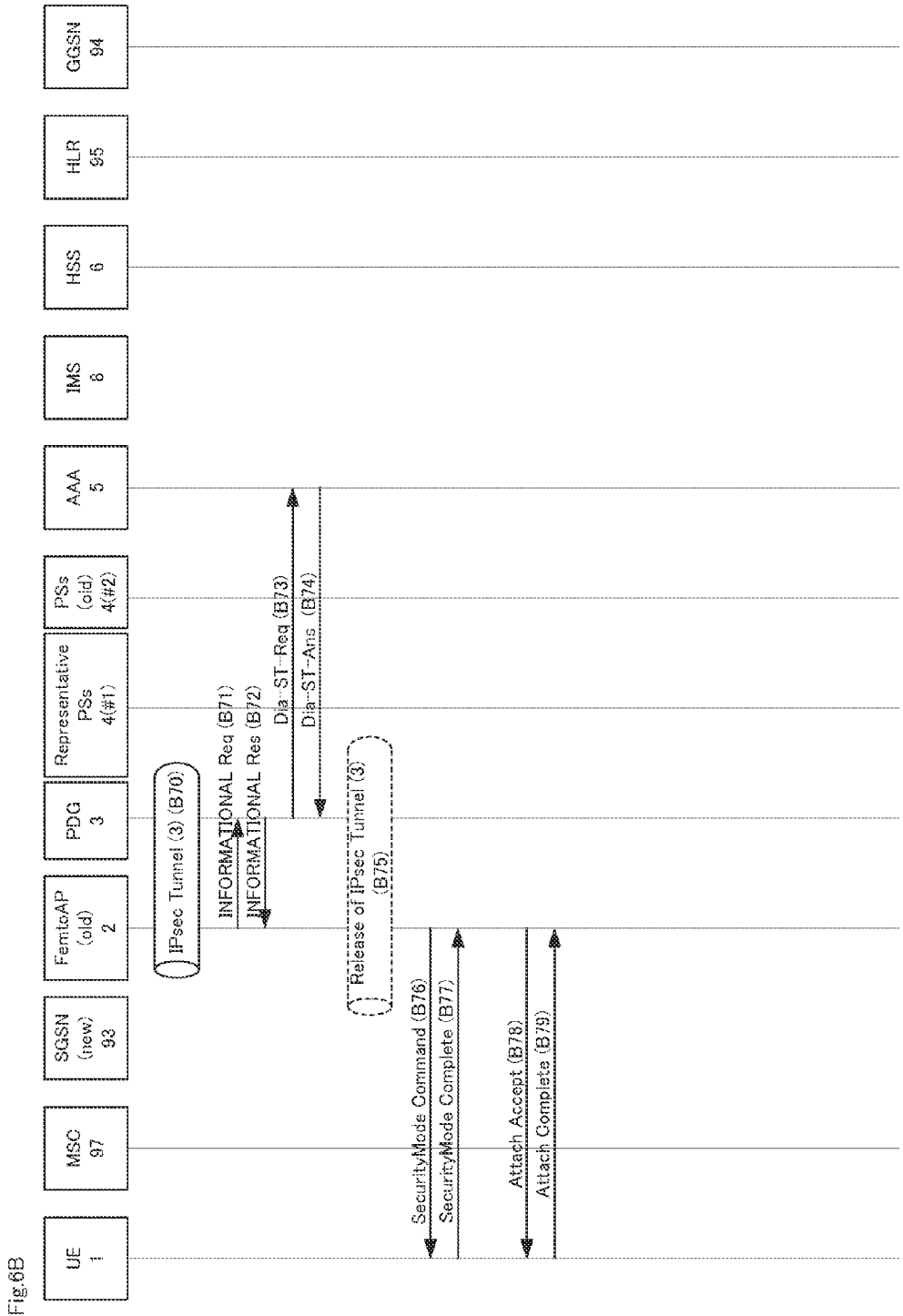
FIG. 6B is a second part of a sequence diagram showing an example of a PS handover operation performed from the IMS-Femto network to the existing 3G network.
Figure 10A:
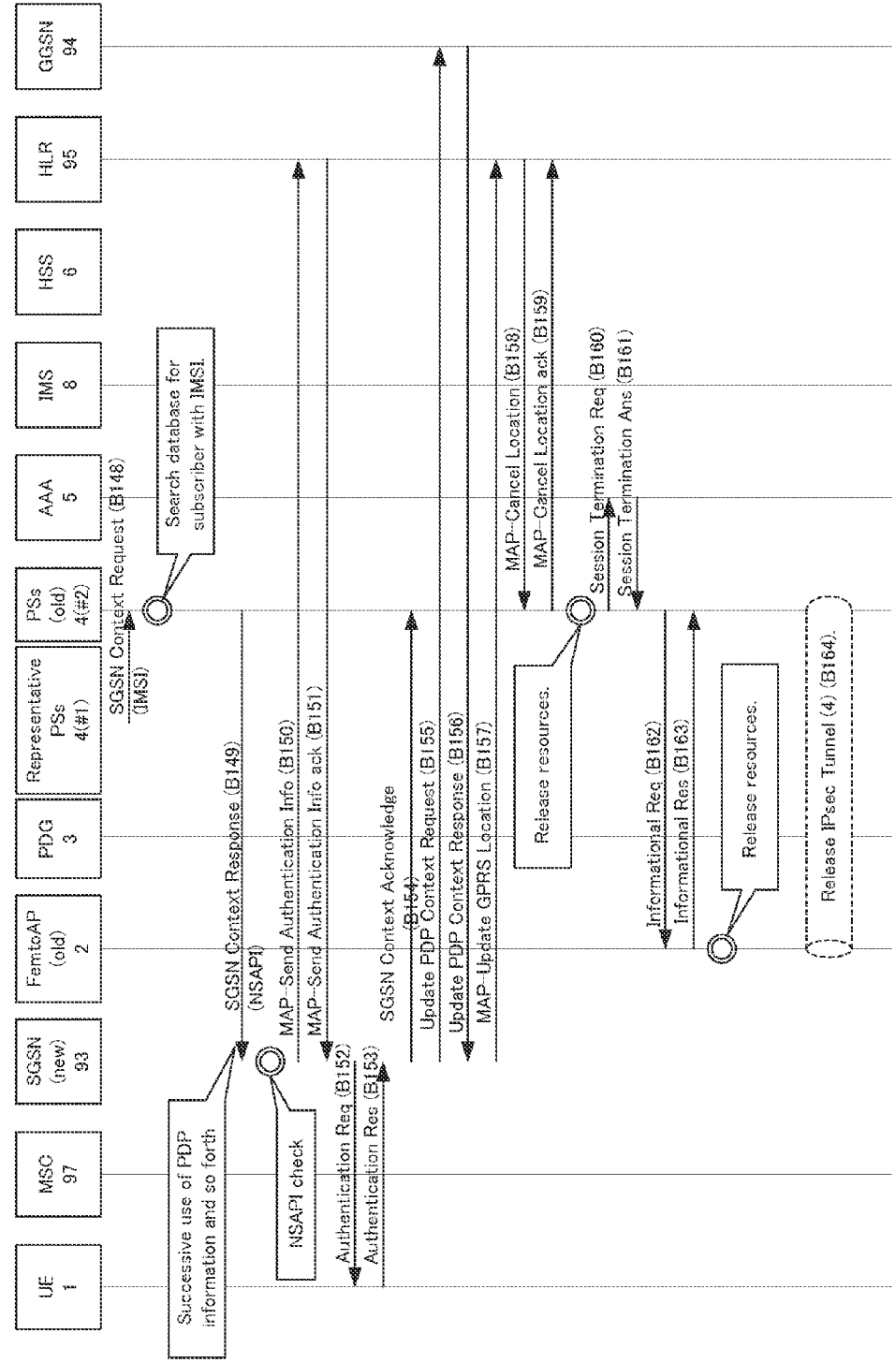
FIG. 10A is a sixth part of a sequence diagram showing an example of a PS handover operation performed from the IMS-Femto network to the existing 3G network.
Figure 11A:
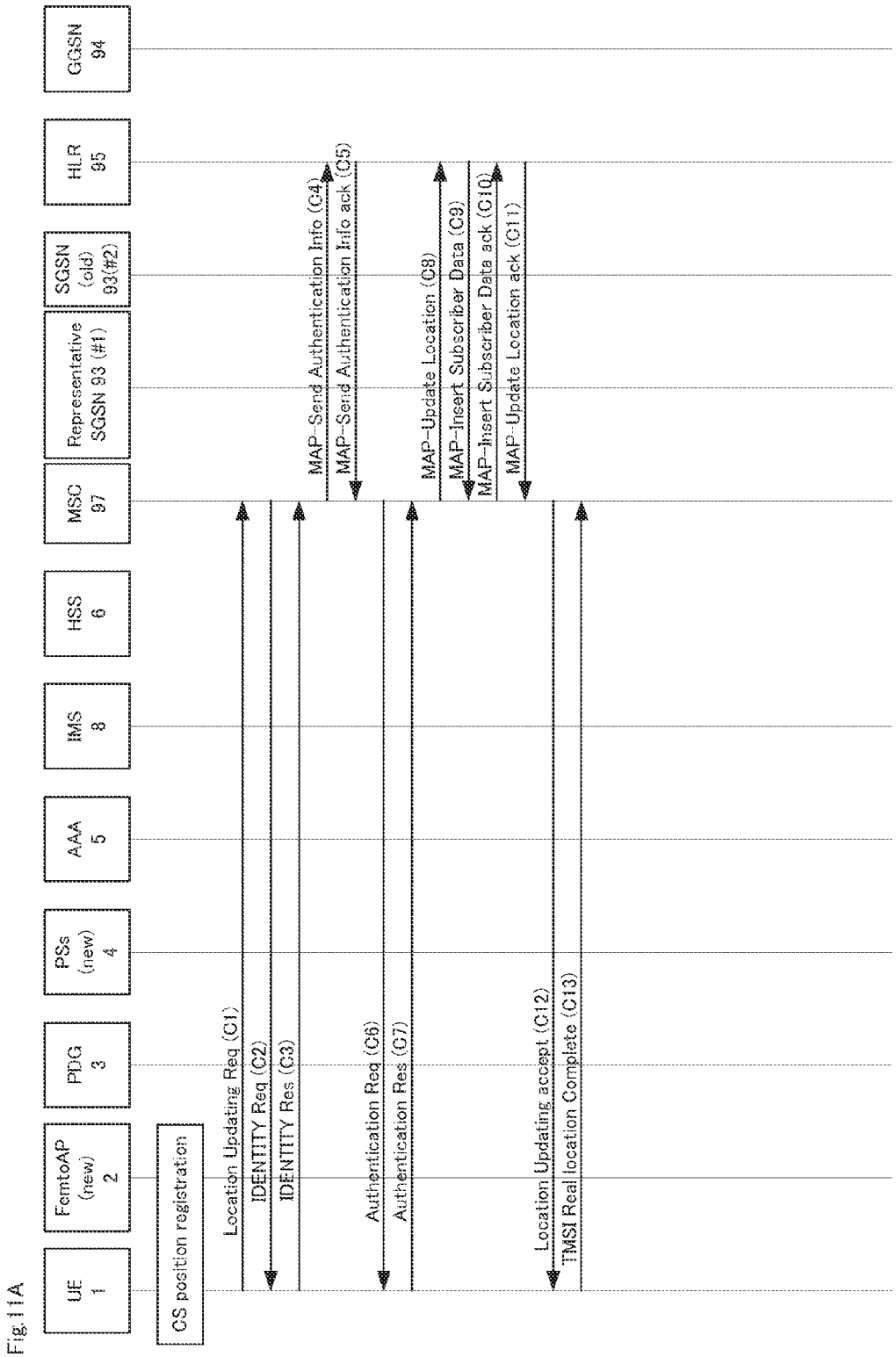
FIG. 11A is a first part of a sequence diagram showing an example of a PS handover operation performed from the existing 3G network to the IMS-Femto network.
Figure 12:
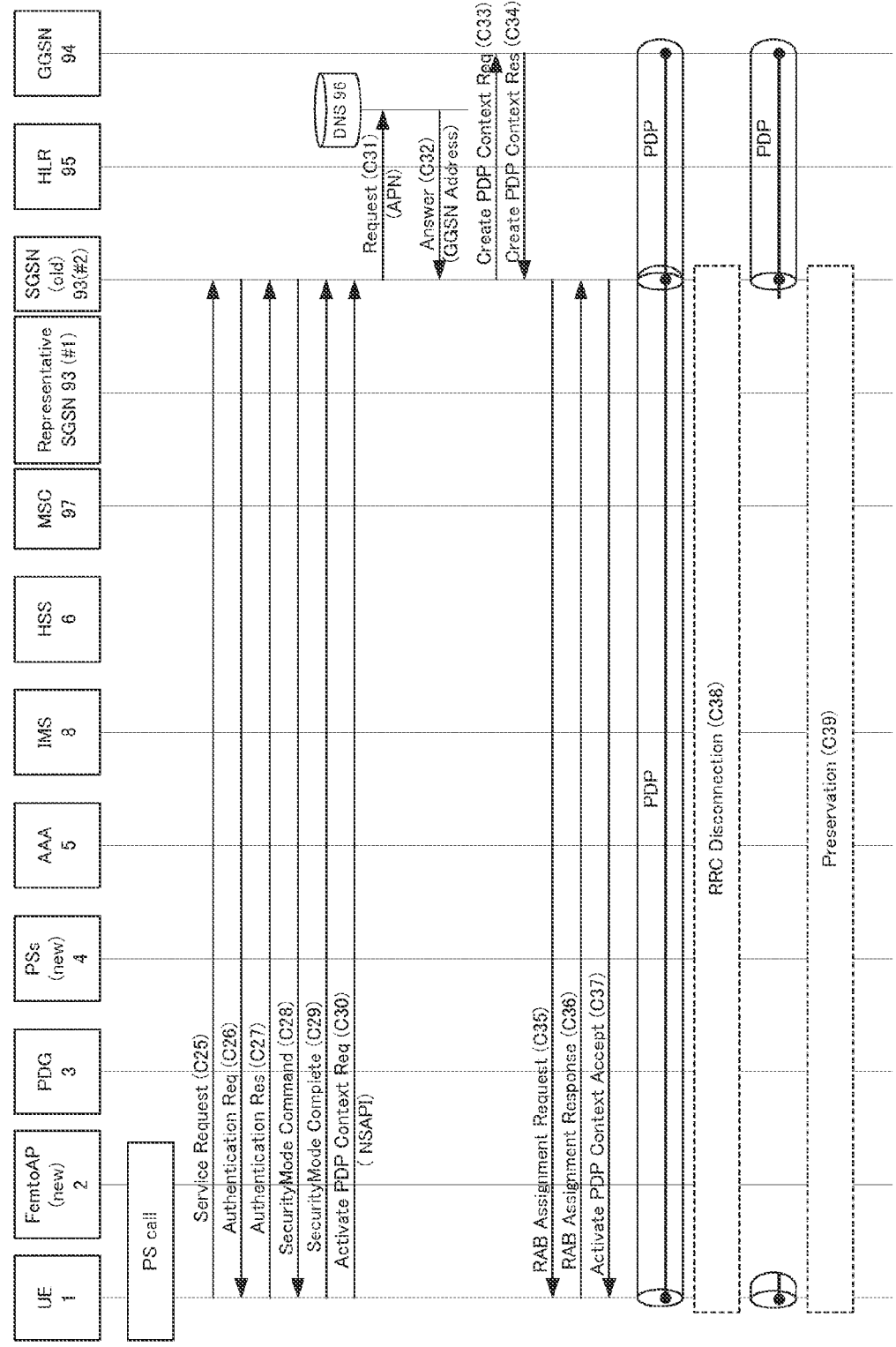
FIG. 12 is a second part of a sequence diagram showing an example of a PS handover operation performed from the existing 3G network to the IMS-Femto network.
Figure 13B:
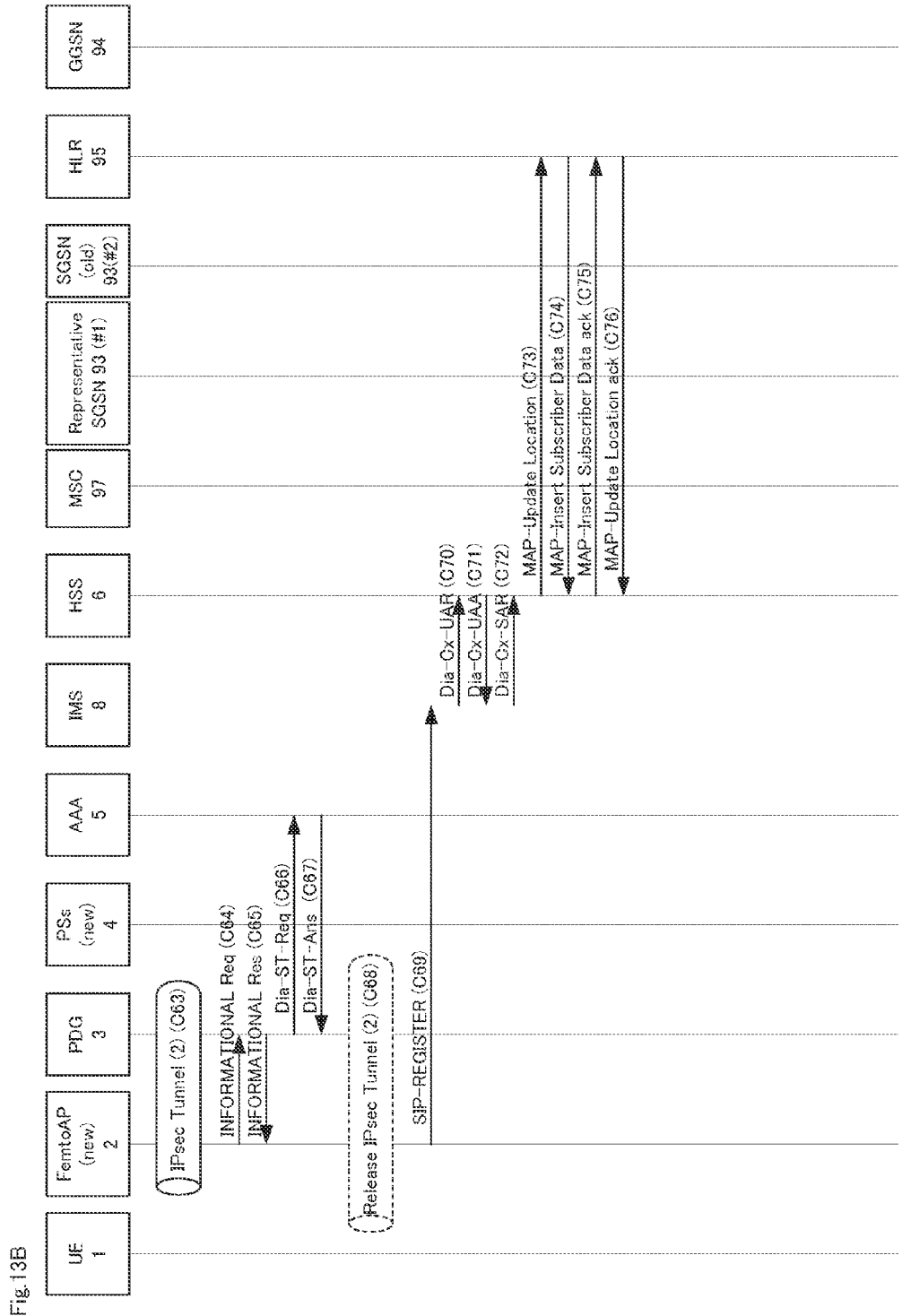
FIG. 13B is a third part of a sequence diagram showing an example of a PS handover operation performed from the existing 3G network to the IMS-Femto network.
Figure 14A:
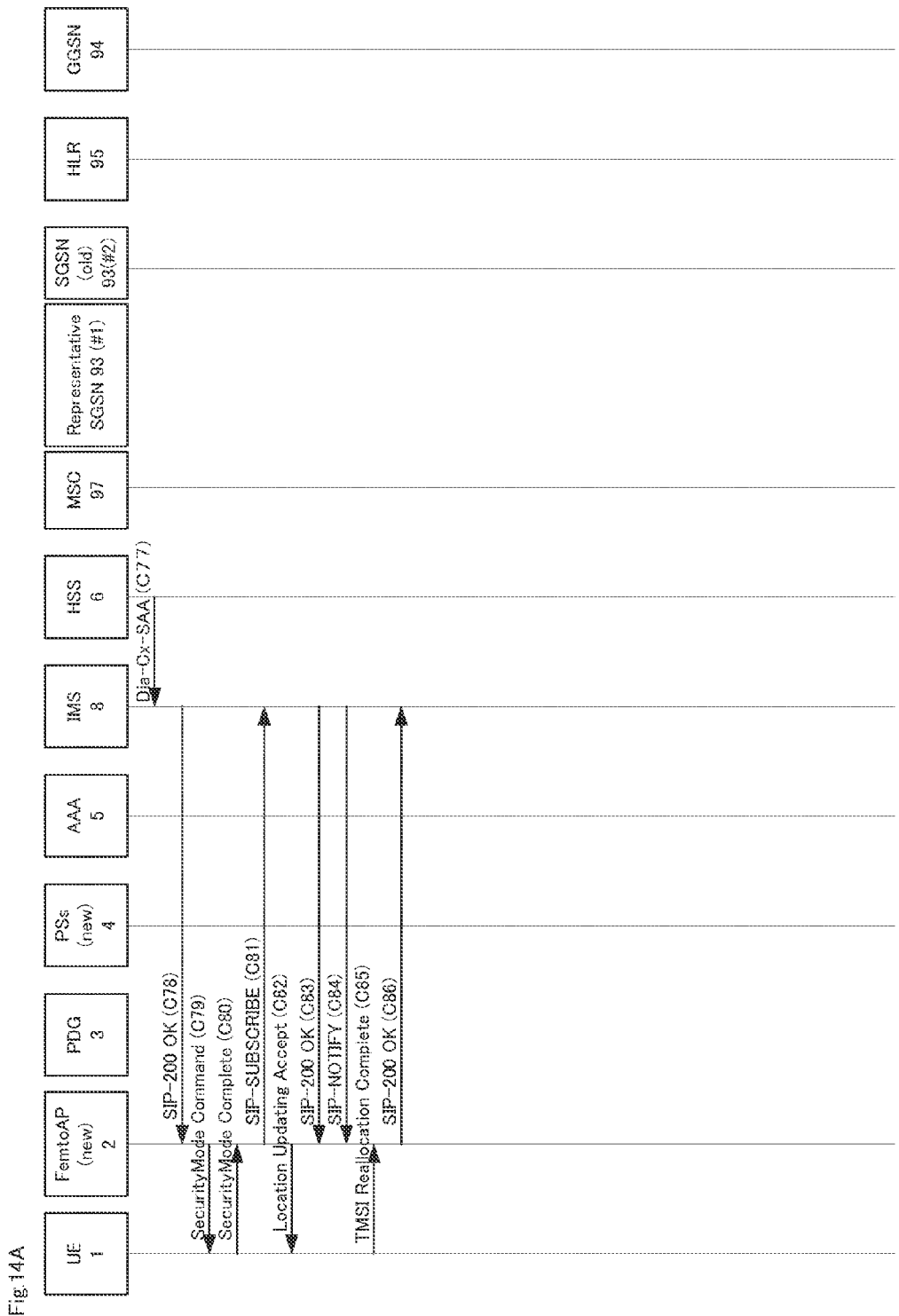
FIG. 14A is a fourth part of a sequence diagram showing an example of a PS handover operation performed from the existing 3G network to the IMS-Femto network.
Figure 14B:
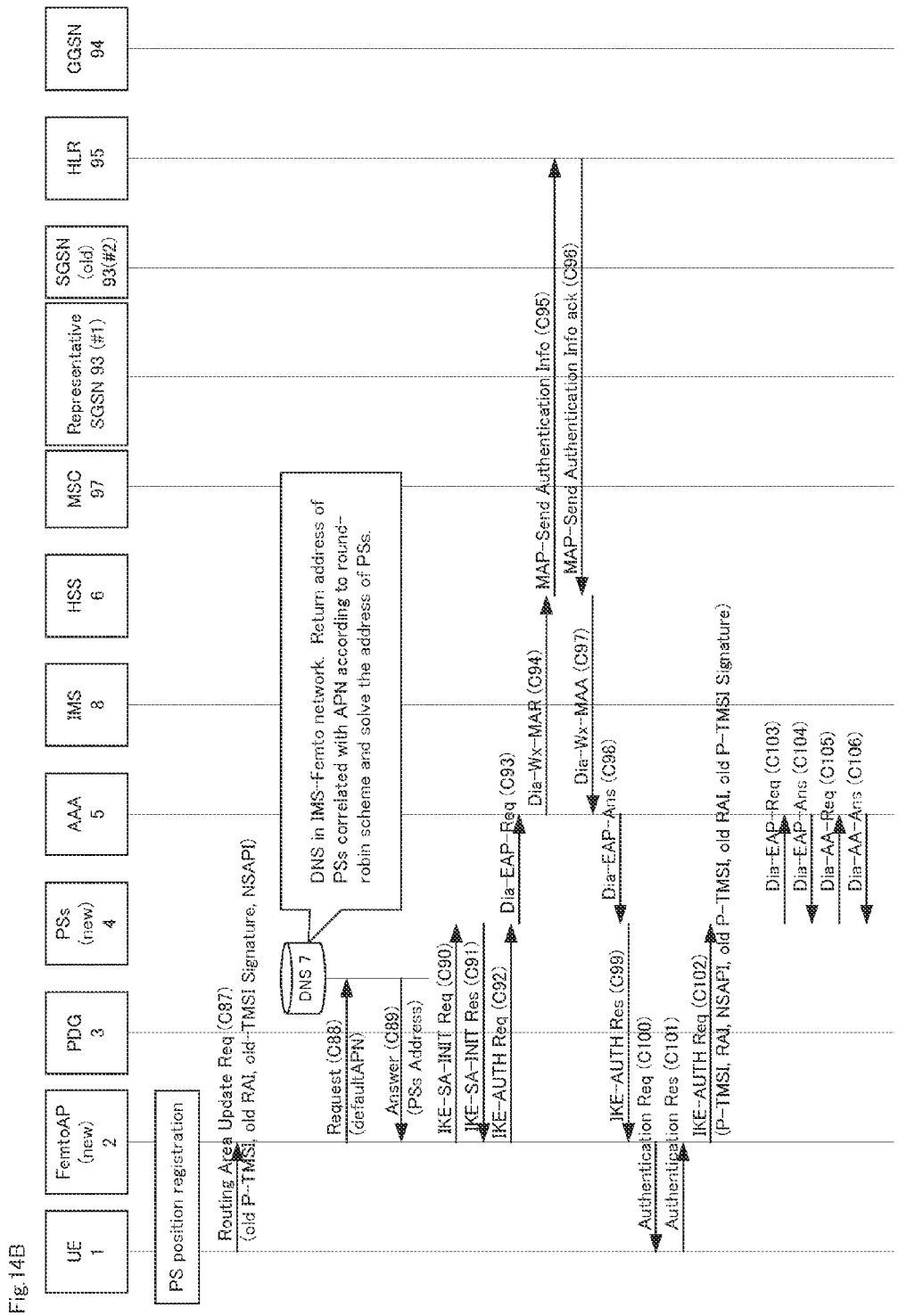
FIG. 14B is a fourth part of a sequence diagram showing an example of a PS handover operation performed from the existing 3G network to the IMS-Femto network.
Figure 15A:
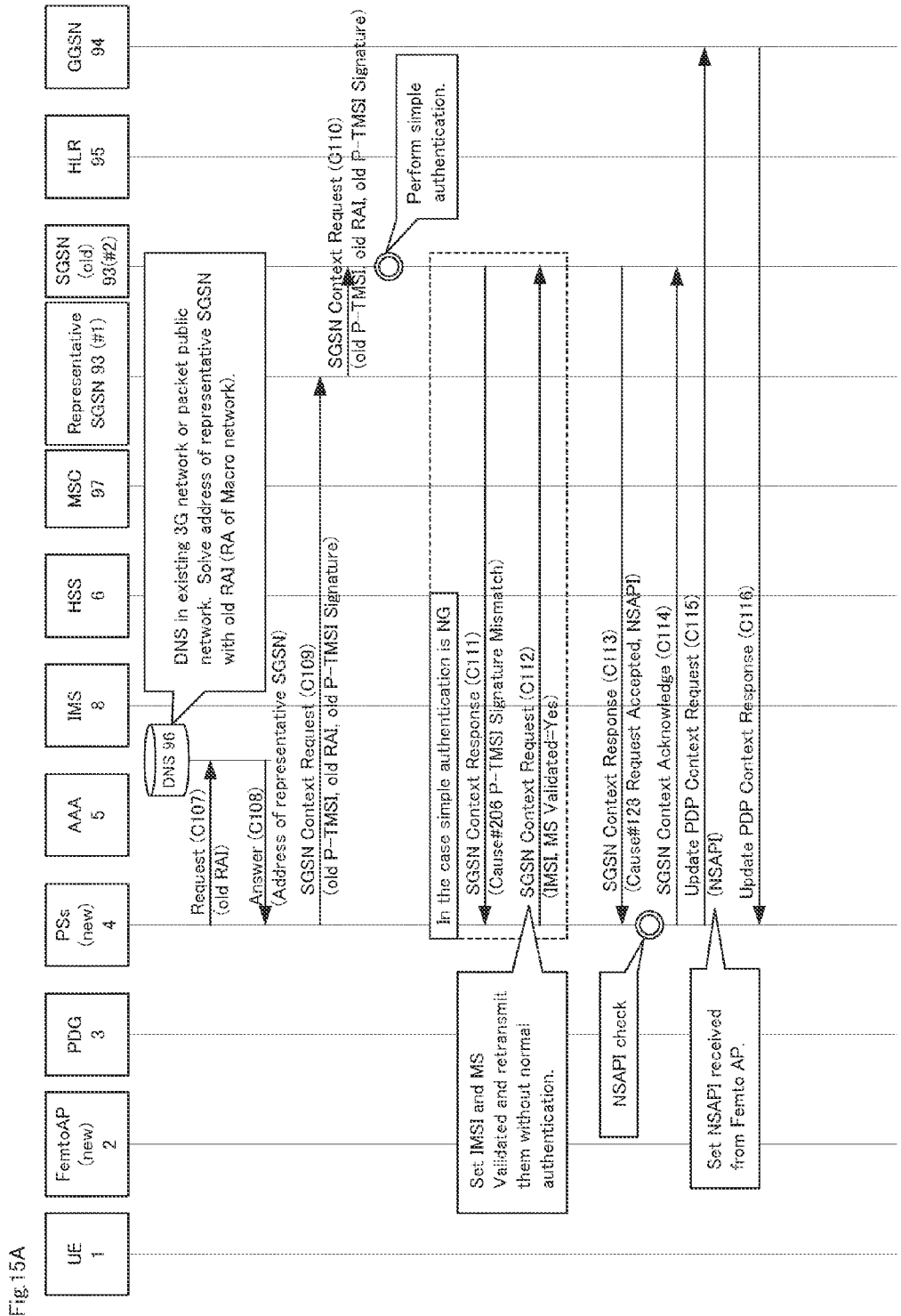
FIG. 15A is a fifth part of a sequence diagram showing an example of a PS handover operation performed from the existing 3G network to the IMS-Femto network.
Figure 15B:
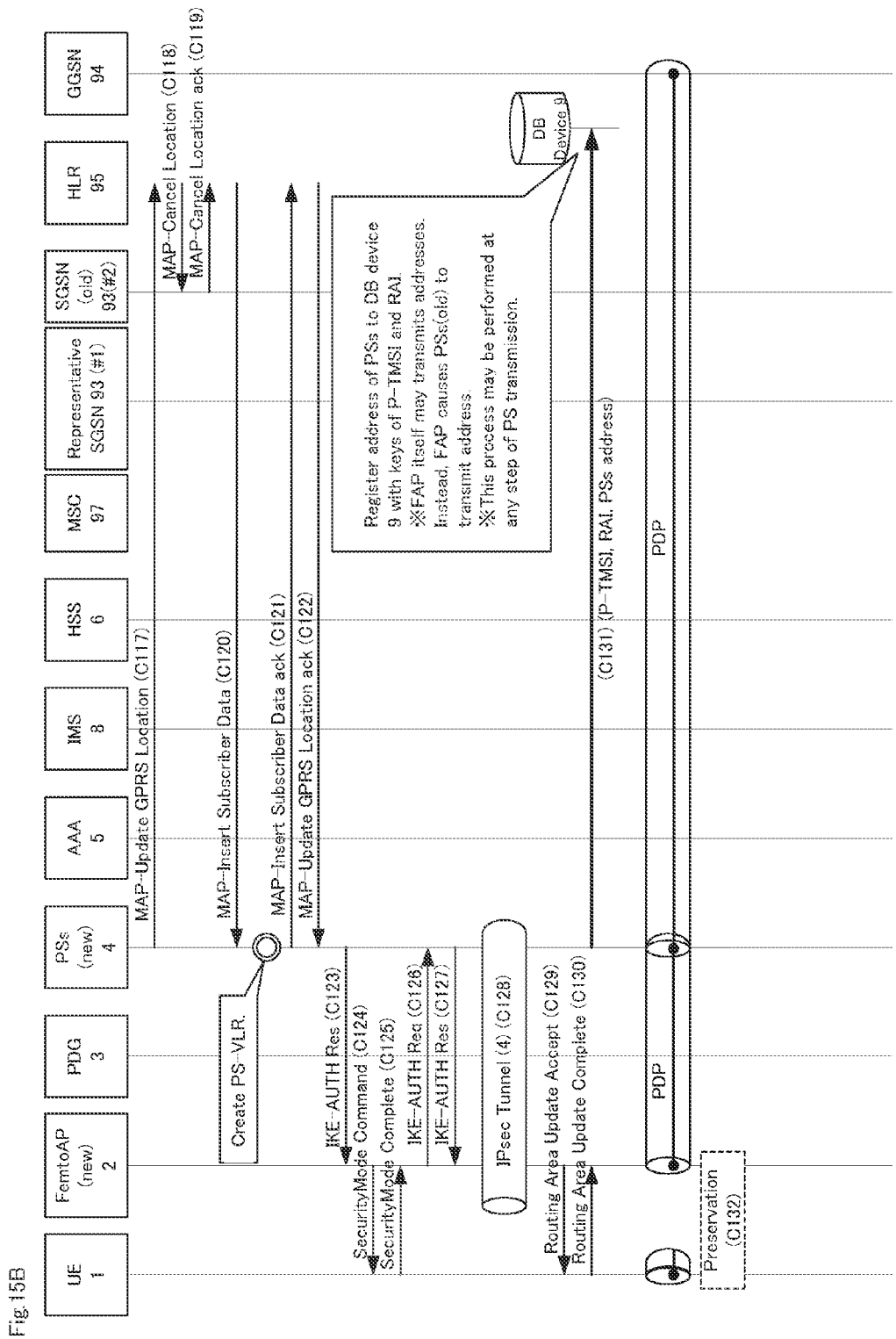
FIG. 15B is a fifth part of a sequence diagram showing an example of a PS handover operation performed from the existing 3G network to the IMS-Femto network.

First, with reference to a sequence diagram shown in FIG. 4, an example of a PS position registration operation in the case in which a UE hands over a call from a Node B under the control of one SGSN of the existing 3G network to a Node B under the control of another SGSN will be described so as to help understand an operation that features this embodiment.

This operation is prescribed in the 3GPP standard. FIG. 4 shows an example in which no simple authentication is implemented.

In the following description, it is assumed that an SGSN that manages a handover source Node B to which the UE belonged is referred to as the SGSN (old) and that an SGSN that manages a handover destination Node B to which the UE newly belongs is referred to as the SGSN (new).

As a PS position registration operation after the UE moves, it transmits a Routing Area Update Request containing an old RAI that identifies the handover source Node B to which the UE belonged, an old P-TMSI received before the UE moved, and a PDP Context Status to the SGSN (new) (at step A1).

Since the SGSN (new) receives the Routing Area Update Request containing the PDP Context Status, the SGSN (new) determines that there is a PDP context to be successively used and transmits an address request for the handover source SGSN (old) containing the old RAI received from the UE to the DNS (at step A2).

When the DNS receives the address request for the SGSN (old), the DNS refers to the old RAI and searches its own device for information of the SGSN (old) that manages the Node B corresponding to the old RAI. The DNS transmits the address information for the SGSN (old) corresponding to the old RAI to the SGSN (new) (at step A3).

When the SGSN (new) receives the address information for the SGSN (old), the SGSN (new) transmits a GTP: SGSN Context Request to the address of the SGSN (old) to cause the SGSN (new) to successively use the PDP context (at step A4).

When the SGSN (old) receives the GTP: SGSN Context Request, the SGSN (old) transmits a GTP: SGSN Context Response containing configuration information of the PDP context to the SGSN (new) so as to cause the SGSN (new) to successively use the PDP context (at step A5). The configuration information of the PDP context contains at least an MM context, a PDP context, an IMSI_UE, and an SGSN address prescribed in the 3GPP standard.

When the SGSN (new) receives the GTP: SGSN Context Response, the SGSN (new) successively uses the PDP context based on the configuration information of the received PDP context and sends back a GTP: SGSN Context Ack to the SGSN (old) (at step A6).

Thereafter, the SGSN (new) transmits a MAP Send Authentication Info to the HLR (at step A7).

When the HLR receives the MAP Send Authentication Info, the HLR transmits a MAP Send Authentication Info Ack to the SGSN (new) (at step A8).

Thereafter, the SGSN (new) transmits a GMM: Authentication Request to the UE (at step A9).

When the UE receives the GMM: Authentication Request, the UE sends back a GMM: Authentication Response to the SGSN (new) (at step A10).

Thereafter, the SGSN (new) transmits a Security Mode Command to the UE (at step A11).

When the UE receives the Security Mode Command, the UE sends back a Security Mode Complete to the SGSN (new) (at step A12).

Thereafter, the SGSN (new) transmits a GTP: Update PDP Context Request to the GGSN (at step A13). When the GGSN receives the GTP: Update PDP Context Request, the GGSN transmits a GTP: Update PDP Context Response to the SGSN (new) (at step A14).

When the SGSN (new) receives the GTP: Update PDP Context Response, the SGSN (new) transmits a MAP Update GPRS Location containing an IMSLUE to the HLR (at step A15).

When the HLR receives the MAP Update GPRS Location, the HLR transmits a MAP Cancel Location containing the IMSLUE to the SGSN (old) (at step A16).

When the SGSN (old) receives the MAP Cancel Location, the SGSN (old) deletes the relevant subscriber data from the storage section of the device and transmits a MAP Cancel Location Ack to the HLR (at step A17).

When the HLR receives the MAP Cancel Location Ack, the HLR transmits a MAP Insert Subscriber Data containing the subscriber information of the IMSLUE to the SGSN (new) (at step A18).

When the SGSN (new) receives the MAP Insert Subscriber Data, the SGSN (new) creates a subscriber profile based on the subscriber information of the IMSLUE and stores it as a PS-VLR. Thereafter, the SGSN (new) sends back a MAP Insert Subscriber Data Ack to the HLR (at step A19).

When the HLR receives the MAP Insert Subscriber Data Ack, the HLR transmits a MAP Update GPRS Location Ack to the SGSN (new) (at step A20).

When the SGSN (new) receives the MAP Update GPRS Location Ack, the SGSN (new) transmits a Routing Area Update Accept to the UE (at step A21).

When the UE receives the Routing Area Update Accept, the UE transmits a Routing Area Update Complete to the SGSN (new) (at step A22).

<Example of PS Handover Operation from IMS-Femto Network to Existing 3G Network>

Next, with reference to sequence diagrams shown in FIG. 5A to FIG. 10B, an example of an operation in the case in which an UE hands over a call from an FAP of the IMS-Femto network according to this embodiment to a Node B of the existing 3G network will be described.

In the following description, it is assumed that a handover source FAP to which the UE belonged is referred to as the FAP (old), a PS server that manages the FAP (old) is referred to as the PS server (old), and an SGSN that manages a handover destination Node B to which the UE newly belongs is referred to as the SGSN (new). In addition, it is assumed that IPsec Tunnel (1) has been established between the FAP (old) and the PDG.

To initially register the position of the UE before it moves, it starts registering the CS position. When the UE registers the CS position, the UE transmits a Location Updating Request to the FAP (old) (at step B2).

When the FAP (old) receives the Location Updating Request, the FAP (old) transmits an IDENTITY Request to the UE (at step B3).

When the UE receives the IDENTITY Request, the UE transmits an IDENTITY Response containing an IMSLUE to the FAP (old) (at step B4). The IMSLUE is information with which the UE is identified.

When the FAP (old) receives the IDENTITY Response, the FAP (old) transmits an IKE-SA-INIT Request to the PDG (at step B5). IKE SA INIT is an acronym of Internet Key Exchange Security Authentication INITialize.

When the PDG receives the IKE-SA-INIT Request, the PDG transmits an IKE-SA-INIT Response to the FAP (old) (at step B6). When the FAP (old) receives the IKE-SA-INIT Response, the IKE SA is established between the FAP (old) and the PDG.

Thereafter, the FAP (old) transmits an IKE-AUTH Request containing an APN (Access Point Name) and an NAI (Network Access Identifier) to the PDG (at step B7). IKE-AUTH is an acronym of Internet Key Exchange AUTHentication. The APN is information with which a connection point of the network is identified. The NAI is information with which a network access is identified.

When the PDG receives the IKE-AUTH Request, the PDG transmits a Dia-EAP Request containing the NAI contained in the IKE-AUTH Request to the AAA (at step B8). Dia EAP is an acronym of Diameter Extensible Authentication Protocol.

When the AAA receives the Dia-EAP Request, the AAA determines whether to register the CS position or BS position or to active a PDP context based on the NAI contained in the Dia-EAP Request. In this example, since the AAA determines to register the CS position based on the NAI, the AAA transmits a Dia-Wx-MAR to the HSS. Dia-Wx-MAR is an acronym of Diameter Wx Multimedia Authentication Request.

When the HSS receives the Dia-Wx-MAR, the HSS transmits a MAP Send Authentication Information containing the IMSLUE contained in the Dia-Wx-MAR to the HLR (at step B9).

When the HLR receives the MAP Send Authentication Information, the HLR obtains RAND/AUTN/CKIK/XRES corresponding to the IMSLUE contained in the MAP Send Authentication Information and transmits a MAP Send Authentication Information Ack containing the RAND/AUTN/CK/IK/XRES to the HSS (at step B10).

The RAND/AUTN/CKIK/XRES is information based on the 3GPP standard. RAND is an acronym of RANDom challenge. AUTN is an acronym of AUthentication TokeN. CK is an acronym of Cipher Key. IK is an acronym of Integrity Key. XRES is an acronym of eXpected RESponse.

The RAND/AUTN/CK/IK/XRES is an example of information contained in the MAP Send Authentication Information Ack that the HLR transmits. Thus, information used for authentication may be any one of various alternatives based on the performance of the NW for which the UE has contracted.

When the HSS receives the MAP Send Authentication Information Ack, the HSS transmits a Dia-Wx-MAA containing the RAND/AUTN/CK/IK/XRES received from the HLR to the AAA. Dia-Wx-MAA is an acronym of Diameter Wx Multimedia Authentication Answer.

When the AAA receives the Dia-Wx-MAA, the AAA transmits a Dia-EAP Answer containing the RAND/AUTN/CK/IK contained in the Dia-Wx-MAA to the PDG (at step B11).

When the PDG receives the Dia-EAP Answer, the PDG transmits an IKE-AUTH Response containing the EAP Request/AKA-Challenge and RAND/AUTN/CK/IK contained in the Dia-EAP Answer to the FAP (old). AKA is an acronym of Authentication and Key Agreement.

When the FAP (old) receives the IKE-AUTH Response, the FAP (old) transmits an Authentication Request containing the RAND/AUTN contained in the IKE-AUTH Response to the UE (at step B12).

When the UE receives the Authentication Request, the UE performs an authentication calculation based on the RAND/AUTN contained in the Authentication Request. The authentication calculation is performed according to a technique based on the 3GPP standard.

The UE calculates the response and transmits an Authentication Response containing the response to the FAP (old) (at step B13). The UE calculates the response according to a technique based on the 3GPP standard.

When the FAP (old) receives the Authentication Response, the FAP (old) transmits an IKE-AUTH Request containing the EAP-Response/AKA-Challenge and the response contained in the Authentication Response to the PDG.

When the PDG receives the IKE-AUTH Request, the PDG calculates an MAC (Message Authentication Code) and transmits a Dia-EAP Request containing the RES and MAC to the AAA (at step B14). The PDG calculates the MAC according to a technique based on the 3GPP standard.

When the AAA receives the Dia-EAP Request, the AAA authenticates the UE. The AAA authenticates the UE according to a technique based on the 3GPP standard. In this example, it is assumed that the AAA has successfully authenticated the UE. The AAA transmits a Dia-EAP Answer containing the EAP-Success to the PDG (at step B15).

When the PDG receives the Dia-EAP Answer, the PDG transmits a Dia-AA-Request containing the APN to the AAA (at step B16).

When the AAA receives the Dia-AA-Request, the AAA transmits a Dia-AA-Answer containing the IMSLUE to the PDG (at step B17).

When the PDG receives the Dia-AA-Answer, the PDG transmits an IKE-AUTH Response containing the EAP-Success to the FAP (old) (at step B8).

When the FAP (old) receives the IKE-AUTH Response, the FAP (old) transmits an IKE-AUTH Request to the PDG (at step B19).

When the PDG receives the IKE-AUTH Request, the PDG transmits an IKE-AUTH Response to the FAP (old) (at step B20).

As a result, the FAP (old) receives the IKE-AUTH Response and thereby IPsec Tunnel (2) is established between the FAP (old) and the PDG (at step B21).

Thereafter, the FAP (old) transmits an INFORMATIONAL Request to the PDG (at step B22).

When the PDG receives the INFORMATIONAL Request, the PDG transmits an INFORMATIONAL Response to the FAP (old) (at step B23).

In addition, the PDG transmits a Dia-ST-Request to the AAA (at step B24).

When the AAA receives the Dia-ST-Request, the AAA transmits a Dia-ST-Answer to the PDG (at step B25).

When the PDG receives the Dia-ST-Answer, the PDG releases IPsec Tunnel (2) established at step B21 (at step B26). After the UE has been authenticated, since IPsec Tunnel (2) that becomes unnecessary is released, the resources can be effectively used.

Thereafter, the FAP (old) transmits a SIP-REGISTER containing the IMSLUE to the IMS core (at step B27).

When the IMS core receives the SIP-REGISTER, the IMS core transmits a Dia-Cx-UAR to the HSS (at step B28).

When the HSS receives the Dia-Cx-UAR, the HSS transmits a Dia-Cx-UAA to the IMS core (at step B29).

When the IMS core receives the Dia-Cx-UAA, the IMS core transmits a Dia-Cx-SAR containing the IMSLUE to the HSS (at step B30).

When the HSS receives the Dia-Cx-SAR, the HSS transmits a MAP Update Location containing the IMSLUE to the HLR (at step B31).

When the HLR receives the MAP Update Location, the HLR transmits a MAP Insert Subscriber Data containing the CS subscriber information of the IMSLUE to the HSS (at step B32).

When the HSS receives the MAP Insert Subscriber Data, the HSS creates a CS subscriber profile based on the subscriber information of the IMSLUE contained in the MAP Insert Subscriber Data. The HSS registers the CS subscriber profile to the CS-VLR so as to manage the CS subscriber profile.

Thereafter, the HSS transmits a MAP Insert Subscriber Data Ack to the HLR (at step B33).

When the HLR receives the MAP Insert Subscriber Data Ack, the HLR transmits a MAP Update Location Ack to the HSS (at step B34).

When the HSS receives the MAP Update Location Ack, the HSS transmits a Dia-Cx-SAA containing the IMSLUE and MSISDN based on the registration information of the CS-VLR to the IMS core (at step B35).

When the IMS core receives the Dia-Cx-SAA, the IMS core transmits a SIP-200 OK containing the MSISDN to the FAP (old) (at step B36).

When the FAP (old) receives the SIP-200 OK, the FAP (old) transmits a Security Mode Command to the UE (at step B37).

When the UE receives the Security Mode Command, the UE performs an encryption process according to a technique based on the 3GPP standard and transmits a Security Mode Complete to the FAP (old) (at step B38).

When the FAP (old) receives the Security Mode Complete, the FAP (old) complements a TMSI (Temporary Mobile Subscriber Identifies) according to a technique based on the 3GPP standard.

The FAP (old) transmits a SIP SUBSCRIBE to the IMS core. The IMS core performs an acknowledge process (at step B39). When the result of the acknowledge process is OK, the IMS core transmits a SIP-200 OK to the FAP (old) (at step B40).

In addition, the IMS core transmits an SIP NOTIFY to the FAP (old) (at step B41). The FAP (old) sends back an SIP-200 OK to the IMS core (at step B42).

The FAP (old) transmits a Location Updating Accept to the UE (at step B43). When the UE receives the Location Updating Accept, the UE transmits a TMSI Reallocation Complete to the FAP (old) (at step B44).

Thus, when the CS position is registered in the communication system according to this embodiment, while IPsec Tunnel (1) is being established between the FAP and the PDG (at step B1), messages are transmitted and received among the UE, FAP (old), PDG. AAA, HSS, and HLR, the authentication process is performed for the UE. If the UE is successfully authenticated, IPsec Tunnel (2) will be established between the FAP (old) and the PDG (at steps B2 to B21). Thereafter, in the authentication process for the UE, IPsec Tunnel (2) that has been established between the FAP (old) and the PDG is released (at steps B22 to B26). Thereafter, the HSS registers the CS subscriber profile obtained from the HLR to the CS-VLR of its own HSS (at steps B27 to B32). As a result, when the CS position is registered, the UE can be authenticated through the FAP (old) and the CS subscriber profile of the UE can be registered to the CS-VLR of the HSS.

Thereafter, to initially register the PS position before the UE performs handover, the UE transmits an Attach Request to the FAP (old) (at step B45).

When the FAP (old) receives the Attach Request, the FAP (old) transmits an IDENTITY Request to the UE (at step B46).

When the UE receives the IDENTITY Request, the UE transmits an IDENTITY Response containing the IMSLUE to the FAP (old) (at step B47). The IMSLUE is information with which the UE is identified.

When the FAP (old) receives the IDENTITY Response, the FAP (old) transmits an address request (Request) for the PDG that its own FAP (old) accesses containing the APN that registers the PS position to the DNS of the IMS-Femto network (at step B48).

When the DNS of the IMS-Femto network receives the address request (Request) containing the APN, the DNS sequentially sends back address information of PDGs according to the round robin scheme. In other words, the DNS transmits address information of a predetermined number of PDGs and then the FAP (old) determines whether or not address information of a PDG can be allocated. If the address information of a PDG can be allocated, the FAP (old) is allocated to the PDG. If the address information of a PDG cannot be allocated, the DNS retransmits the address information of a predetermined number of PDGs. The DNS sends back (answers) the address information of PDGs that can be allocated to the FAP (old) (at step B49).

When the FAP (old) receives the address of the PDG, the FAP (old) transmits an IKE-SA-INIT Request to the PDG (at step B50). Thereafter, the IKE SA is established between the FAP (old) and the PDG (at step B51).

The FAP (old) transmits an IKE-AUTH Request containing the APN (Access Point Name) and NAI (Network Access Identifier) to the PDG (at step B52).

Since the FAP (old) has received the Attach Request from the UE, the FAP (old) determines to register the PS position and transmits a "OPS0<UE_IMSI>/<Femto_IMSI>@realmname" as the NAI. "OPS0" is information that represents the registration of the PS position. "<UE_IMSI>" is information with which the UE is identified and is IMSLUE contained in the IDENTITY Response received at step B47. "Femto_IMSI" is information with which the FAP (old) is identified.

When the PDG receives the IKE-AUTH Request, the PDG transmits a Dia-EAP Request containing the NAI contained in the IKE-AUTH Request to the AAA (at step B53).

When the AAA receives the Dia-EAP Request, the AAA determines whether to register the CS position or PS position or activate a PDP context based on the NAI contained in the Dia-EAP Request. In this example, since the AAA determines to register the PS position, the AAA transmits a Dia-Wx-MAR to the HSS (at step B54).

Since the NAI is "OPS0<UE_IMSI>/<Femto_IMSI>@realmname," the AAA determines to register the PS position, the AAA transmits a Dia-Wx-MAR containing the IMSI of the NAI contained in the Dia-EAP Request.

When the HSS receives the Dia-Wx-MAR, the HSS transmits a MAP Send Authentication Info containing the IMSLUE contained in the Dia-Wx-MAR to the HLR (at step B55).

Steps B56 to B69 are the same as steps B10 to B20 except that the PS position is registered. Steps B59 and B60 correspond to step B12: steps B61 and B62 correspond to step B13.

When the FAP (old) receives the IKE-AUTH Response, IPsec Tunnel (3) is established between the FAP (old) and the PDG (at step B70).

Thereafter, the FAP (old) transmits an INFORMATION Request to the PDG (at step B71).

When the PDG receives the INFORMATION Request, the PDG transmits an INFORMATION Response to the FAP (old) (at step B72).

In addition, the PDG transmits a Dia-ST-Request to the AAA (at step B73).

When the AAA receives the Dia-ST-Request, the AAA transmits a Dia-ST-Answer to the PDG (at step B74).

When the PDG receives Dia-ST-Answer, the PDG releases IPsec Tunnel (3) that has been established at step B70 (at step B75). After the UE has been authenticated, when IPsec Tunnel (3) that becomes unnecessary is released, the resources can be effectively used.

Thereafter, the FAP (old) transmits a Security Mode Command to the UE (at step B76).

When the UE receives the Security Mode Command, the UE transmits a Security Mode Complete to the FAP (old) (at step B77).

When the FAP (old) receives the Security Mode Complete, the FAP (old) transmits an Attach Accept containing the P-TMSI to the UE (at step B78). The P-TMSI contained in the Attach Accept is issued by the FAP (old) to the UE and may be any form as long as the P-TMSI satisfies conditions prescribed in the 3GPP standard. In other words, the NRI contained in the P-TMSI may be any value such as a predetermined fixed value that depends on the applied design.

When the UE receives the Attach Accept, the UE stores the P-TMSI in its own UE and transmits an Attach Complete to the FAP (old) (at step B79).

Thereafter, as a PS call that the UE performs before it moves, the UE transmits a Service Request to the FAP (old) (at step B80).

When the FAP (old) receives the Service Request, the FAP (old) transmits a Security Mode Command to the UE (at step B81).

When the UE receives the Security Mode Command, the UE transmits a Security Mode Complete to the FAP (old) (at step B82).

Thereafter, the UE transmits an Activate PDP Context Request containing the IMSLUE, the APN (Access Point Name) of the FAP (old) to which the UE belongs, and the NSAPI (Network Service Access Point Identity) to the FAP (old) (at step B83). The NSAPI is a parameter of the Activate PDP Context Request signal prescribed in the 3GPP standard.

When the FAP (old) receives the Activate PDP Context Request, the FAP (old) transmits an address request (Request) for the PS server (old) that manages the own device containing the APN received from the UE to the DNS of the IMS-Femto network (at step B84).

When the DNS of the IMS-Femto network receives the address request (Request) containing the APN, the DNS sequentially sends back address information of PS servers according to the round robin scheme. In other words, the DNS transmits address information of a predetermined number of PS servers and then the FAP (old) determines whether or not address information of a PS server can be allocated. If the address information of a PS server can be allocated, the FAP (old) is allocated to the PS server. If the address information of a PS server cannot be allocated, the DNS retransmits address information of a predetermined number of PS servers. The DNS sends back (answers) the address information of PS servers that can be allocated to the FAP (old) (at step B85).

When the FAP (old) receives the address of the PS server (old), the FAP (old) transmits an IKE-SA-INIT Request to the PS server (old) (at step B86).

When the PS server (old) receives the IKE-SA-INIT Request, the PS server (old) transmits an IKE-SA-INIT Response to the FAP (old) (at step B87).

When the FAP (old) receives the IKE-SA-INIT Response, the FAP (old) transmits an IKE-AUTH Request containing the APN and NAT (Network Access Identifier) to the PS server (old) (at step B88).

Since the FAP (old) has received the Activate PDP Context Request from the UE, the FAP (old) determines to activate the PDP context, the PS server (old) transmits a "0PDP0<UE_IMSI>/<Femto_IMSI>@realmname" as the NAI. "0PDP0" is information that represents the activation of the PDP. "<UE_IMSI>" is information with which the UE is identified and is the IMSLUE contained in the Activate PDP Context Request received at step B83. "<Femto_IMSI>" is information with which the FAP (old) is identified.

When the PS server (old) receives the IKE-AUTH Request, the PS server (old) transmits a Dia-EAP Request containing both the NAI contained in the IKE-AUTH Request and an EAP-Payload (empty) to the AAA (at step B89).

When the AAA receives the Dia-EAP Request, the AAA determines whether to register the CS position or PS position or activate a PDP context based on the NAI contained in the Dia-EAP Request. When the AAA determines to activate the PDP context, the AAA transmits a Dia-Wx-MAR to the HSS (at step B90).

Since the NAI is "0PDP0<UE_IMSI>/<Femto_IMSI>@realmname," the AAA determines to activate the PDP context, the AAA transmits a Dia-Wx-MAP containing the IMSLUE of the NAT contained in the Dia-EAP Request to the HSS.

When the HSS receives the Dia-Wx-MAR, the HSS transmits a MAP-SAI [PDP]containing the IMSLUE contained in the Dia-Wx-MAR to the HLR (at step B91). MAP-SAI is an acronym of MAP Send Authentication Info. [PDP] represents PDP Activate.

When the HLR receives the MAP-SAI [PDP], the HLR obtains RAND/AUTN/CK/IK/XRES that corresponds to the IMSLUE contained in the MAP-SAI [PDP] and transmits a MAP-SAI Ack containing the RAND/AUTN/CK/IK/XRES to the HSS (at step B92).

When the HSS receives the MAP-SAI Ack, the HSS transmits a Dia-Wx-MAA containing the RAND/AUTN/CK/IK/XRES contained in the MAP-SAI Ack to the AAA (at step B93).

When the AAA receives the Dia-Wx-MAA, the AAA transmits a Dia-EAP Answer containing a Result-Code (multi-round) and EAP Request/AKA-Challenge to the PS server (old) (at step B94).

When the PS server (old) receives the Dia-EAP Answer, the PS server (old) transmits an IKE-AUTH Response containing the EAP Request/AKA-Challenge to the FAP (old) (at step B95).

When the FAP (old) receives the IKE-AUTH Request, the FAP (old) transmits an Authentication Request to the UE (at step B96).

When the UE receives the Authentication Request, the UE transmits an Authentication Response to the FAP (old) (at step B97).

When the FAP (old) receives the Authentication Response, the FAP (old) transmits an IKE-AUTH Request containing the EAP-Response/AKA-Challenge. Private Extension, and NSAPI received from the UE at step B83 to the PS server (old) (at step B98).

When the PS server (old) receives the IKE-AUTH Request, the PS server (old) stores the NSAPI and so forth in its own PS server (old), and transmits a Dia-EAP Request containing the EAP-Response/AKA-Challenge to the AAA (at step B99).

When the AAA receives the Dia-EAP Request, the AAA transmits a Dia-EAP Answer to the PS server (old) (at step B100). If the UE is successfully authenticated, the AAA will transmit a Dia-EAP Answer containing the Result-Code (Success) and EAP Request/Success to the PS server (old).

When the PS server (old) receives the Dia-EAP Answer, the PS server (old) transmits a Dia-AA-Request to the AAA (at step B101).

When the AAA receives the Dia-AA-Request, the AAA transmits a Dia-AA-Answer to the PS server (old) (at step B102). If the UE is successfully authenticated, the AAA will transmit a Dia-AA-Answer containing the Result-Code (Success) to the PS server (old).

When the PS server (old) receives the Dia-AA-Answer, the PS server (old) transmits a MAP Update GPRS Location to the HLR (at step B103).

When the HLR receives the MAP Update GPRS Location, the HLR transmits a MAP Insert Subscriber Data containing the same PS subscriber information as that transmitted to an SGSN of the existing 3G network to the PS server (old) (at step B104).

When the PS server (old) receives the MAP Insert Subscriber Data, the PS server (old) creates a PS subscriber profile based on the PS subscriber information of the IMSLUE contained in the MAP Insert Subscriber Data and registers the PS subscriber profile to the PS-VLR so as to manage the PS subscriber profile. Thereafter, the PS server (old) sends back a MAP Insert Subscriber Data Ack to the HLR (at step B105).

When the HLR receives the MAP Insert Subscriber Data Ack, the HLR transmits a MAP Update GPRS Location Ack to the PS server (old) (at step B106).

When the PS server (old) receives the MAP Update GPRS Location Ack, the PS server (old) transmits an address request (Request) for a GGSN containing the APN of the FAP (old) to the DNS of the existing 3G network or packet public network (at step B107).

The DNS of the existing 3G network or packet public network sends back (answers) the address of the GGSN that the PS server (old) needs to access based on APN contained in the address request (Request) (at step B108).

When the PS server (old) receives the address of the GGSN, the PS server (old) transmits a Create PDP Context Request containing the MSISDN of the UE and the NSAPI received from the FAP (old) to the received address (at step B109).

When the GGSN receives the Create PDP Context Request, the GGSN transmits a Create PDP Context Response to the PS server (old) (at step B110).

When the PS server (old) receives the Create PDP Context Response, the PS server (old) transmits an IKE-AUTH Response containing the EAP Request/Success to the FAP (old) (at step B111).

When the FAP (old) receives the IKE-AUTH Response, the FAP (old) transmits a Security Mode Complete to the UE (at step B112).

When the UE receives the Security Mode Complete, the UE transmits a Security Mode Complete to the FAP (old) (at step B113).

When the FAP (old) receives the Security Mode Complete, the FAP (old) performs a 3G wireless encryption process and transmits an IKE-AUTH Request to the PS server (old) (at step B114). The FAP (old) performs the 3G wireless encryption process according to a technique based on the 3GPP standard.

When the PS server (old) receives the IKE-AUTH Request, the PS server (old) transmits an IKE-AUTH Response containing the CF (Remote IP address) to the FAP (old) (at step B115). The CF (Remote IP address) is an IP address of the connection source and which is notified to the FAP (old) when IPSec is newly established upon reception of the Active PDP Context and serves to transmit user data.

When the FAP (old) receives the IKE-AUTH Response, IPsec Tunnel (4) is established between the FAP (old) and the PS server (old) (at step B116). Thereafter, the FAP (old) transmits a Radio Bearer Setup to the UE (at step B117).

When the UE receives the Radio Bearer Setup, the UE sends back a Radio Bearer Setup Complete to the FAP (old) (at step B118). When the FAP (old) receives the Radio Bearer Setup Complete, the FAP (old) transmits an Activate PDP Context Accept to the UE (at step B119), transmits a set of the P-TMSI, the RAI of its own FAP (old), the IMSI_UE, and the address information of the PS server (old) to the DB device of the IMS-Femto network, and registers the set of information to the database of the DB device (at step B120). The P-TMSI transmitted to the DB device is issued by the FAP (old) to the UE at step B78.

When the DB device of the IMS-Femto network receives the set of the P-TMSI, RAI, IMSI_UE, and the address information of the PS server (old) as registration information, the DB device correlates the P-TMSI, RAI, IMSI_UE, and the address information of the PS server (old) and stores them as a database.

The registration operation to the DB device at step B120 may not be performed at the forgoing timing, but at any predetermined timing after the FAP (old) receives the address information of the PS server (old) from the DNS of the IMS-Femto network and communicates with the PS server (old) until the PDP context is activated.

The registration operation to the DB device at step B120 may be not limited to an operation in which the FAP (old) transmits a registration request to the DB device. Alternatively, the registration operation may be an operation in which the FAP (old) transmits registration information to the PS server (old) and then the PS server (old) transmits a registration request to the DB device.

In this case, the FAP (old) may transmit a registration request to the DB device at any predetermined timing after the FAP (old) receives the address information of the PS server (old) from the DNS of the IMS-Femto network and communicates with the PS server (old), the FAP (old) transmits registration information containing address information of the PS server (old), P-TMSI, RAI, IMSI_UE to the PS server (old), and the PS server (old) receives the registration information until the PDP context is activated.

Alternatively, the FAP (old) may transmit the P-TMSI, RAI, and IMSI_UE to the PS server (old) and the PS server (old) may transmit registration information in which the received information contains the address information of its own PS server (old) to the DB device at any predetermined timing until the PDP context is activated.

It is preferred that the registration information transmitted from the FAP (old) to the PS server (old) be at least contained in a signal transmitted at any one of steps B86, B88, B98, and B114.

As a result, the PDP context is activated and thereby the UE can communicate with the device of the remote party through the FAP (old). Thereafter, if no communication state continues for a predetermined time, an RRC Disconnection automatically releases only the wireless channel between the UE and the FAP (old) (at step B121) and then the preservation state occurs (at step B122).

After a communication connection is established based on the PDP context, when the UE moves from the FAP (old) of the IMS-Femto network to the Node B of the existing 3G network (Macro network), the UE starts registering the CS position in the existing 3G network. Thus, the UE transmits a Location Updating Request to the MSC that manages the handover destination Node B (at step B123).

When the MSC receives the Location Updating Request, the MSC transmits an IDENTITY Request to the UE (at step B124).

When the UE receives the IDENTITY Request, the UE transmits an IDENTITY Response containing the IMSLUE to the MSC (at step B125).

When the MSC receives the IDENTITY Response, the MSC transmits a MAP Send Authentication Information containing the IMSLUE to the HLR (at step B126).

When the HLR receives the MAP Send Authentication Information, the HLR transmits a MAP Send Authentication Information Ack to the MSC (at step B127).

When the MSC receives the MAP Send Authentication Information Ack, the MSC transmits an Authentication Request to the UE (at step B128).

When the UE receives the Authentication Request, the UE performs an authentication calculation based on information contained in the Authentication Request. The UE performs the authentication calculation according to a technique based on the 3GPP standard. The UE transmits an Authentication Response containing the calculated authentication information to the MSC (at step B129).

When the MAC receives the Authentication Response, the MSC transmits an MAP Update Location to the HLR (at step B130).

When the HLR receives the MAP Update Location, the HLR transmits a MAP Cancel Location containing the IMSLUE to the HSS (at step B131).

When the HSS receives the MAP Cancel Location, the HSS deletes the relevant CS subscriber profile from the CS-VLR and transmits a MAP Cancel Location Ack to the HLR (at step B132).

When the HLR receives the MAP Cancel Location Ack, the HLR transmits a MAP Insert Subscriber Data containing the subscriber information of IMSLUE to the MSC (at step B133).

When the MSC receives the MAP Insert Subscriber Data, the MSC creates a CS subscriber profile based on the subscriber information of IMSLUE contained in the MAP Insert Subscriber Data and registers the CS subscriber profile to the CS-VLR so as to manage it. Thereafter, the MSC transmits a MAP Insert Subscriber Data Ack to the HLR (at step B134).

When the HRL receives the MAP Insert Subscriber Data Ack, the HRL transmits a MAP Update Location Ack to the MSC (at step B135).

When the MSC receives the MAP Update Location Ack, the MSC transmits a Location Updating Accept to the UE (at step B136).

When the UE receives the Location Updating Accept, the UE transmits a TMSI Reallocation Complete to the MSC (at step B137). When the MSC receives the TMSI Reallocation Complete, the MSC correlates the IMSLUE of the UE and the new TMSI so as to manage the subscriber information (CS) of the UE.

After the HSS transmits the MAP Cancel Location Ack to the HLR at step B132, the HSS transmits a Dia-Cx-RTR (Registration-Termination-Request) to the IMS core (at step B138).

When the IMS core receives the Dia-Cx-RTR, the IMS core transmits a Dia-Cx-RTA (Registration Termination Answer) to the HSS (at step B139). In addition, the IMS core transmits an SIP NOTIFY to the handover source FAP (old) (at step B140). The IMS core sets state="terminated," event="deactivated," and so forth to the Contact tag of the body of SIP NOTIFY such that the message represents De-Register.

When the FAP (old) receives the SIP NOTIFY, the FAP (old) deletes the subscriber information (CS) of the UE, releases connection to the IMS core, and transmits an SIP-200 OK to the IMS core (at step B141).

Thereafter, to register the PS position after the UE performs handover, the UE transmits a Routing Area Update Request containing the old RAI that identifies the handover source FAP (old), the old P-TMSI that the UE received before it moved, the NSAPI, and the PDP Context Status to the SGSN (new) (at step B142).

When the SGSN (new) receives the Routing Area Update Request containing the PDP Context Status, the SGSN (new) determines to successively use the PDP context and transmits an address request for the handover source SGSN containing the old RAI received from the UE to the DNS of the existing 3G network or packet public network (at step B143).

The DNS of the existing 3G network or packet public network correlatively stored all FAPs and RAIs to the address of the representative PS server. Thus, when the DNS receives an address request containing the RAI of the FAP (old), the DNS sends back (answers) the address of the representative PS server that has been preset in the IMS-Femto network to the SGSN (new) (at step B144).

When the SGSN (new) receives the address from the DNS, the SGSN (new) transmits an SGSN Context Request to the address so as to successively use the PDP context (at step B145). Since the SGSN (new) has received the address of the representative PS server as the address of the handover source SGSN, the SGSN (new) transmits the SGSN Context Request containing the IMSLUE, old RAI, and old P-TMSI to the address of the representative PS server at step B145.

When the representative PS server receives the SGSN Context Request, the representative PS server transmits an address request (Request) for the PS server (old) that managed the handover source FAP (old) containing the IMSLUE contained in SGSN Context Request at step B145, the old RAI, and the old P-TMSI to the DB device of the IMS-Femto network (at step B146).

When the DB device of the IMS-Femto network receives the address request (Request) from the representative PS server, the DB device searches the database of the own device for address information with a combination of keys of the old P-TMSI and old RAI contained in the address request (Request). The DB device obtains the address information of PS server (old) correlated with the old P-TMSI and old RAI. If the IMSI_UE stored in the database matches the IMSI_UE contained in the address request (Request), the DB device sends back (answers) the address information and IMSI_UE of the PS server (old) to the representative PS server (at step B147).

When the representative PS server receives the address information and IMSI_UE of the PS server (old), if the received address information does not match the address information of its own representative PS server, the representative PS server forwards the SGSN Context Request received at step B145 to the received address of the PS server (old) (at step B148).

When the PS server (old) receives the SGSN Context Request, the PS server (old) searches the subscriber profile of the PS-VLR for configuration information of the PDP context corresponding to the IMSLUE based on the IMSLUE, old RAI, and old P-TMSI contained in the SGSN Context Request and identifies the configuration information of the PDP context corresponding to the IMSLUE. The PS server (old) transmits an SGSN Context Response containing the configuration information of the PDP context that has been identified and the NSAPI received from the FAP (old) at step B98 to the SGSN (new) so as to successively use the PDP context (at step B149). It is assumed that the configuration information of the PDP context contains at least MM context, PDP context, IMSI_UE, and SGSN address prescribed in the 3GPP standard.

When the SGSN (new) receives the SGSN Context Response, the SGSN (new) performs an NSAPI check that compares the NSAPI contained in the SGSN Context Response with the NSAPI obtained in reply to the Routing Area Update Request received from the UE at step B142. If they match, the SGSN (new) determines that the result of the NSAPI check is OK and successively uses the PDP context based on the configuration information of the PDP context contained in the received SGSN Context Response.

Thereafter, the SGSN (new) transmits a MAP Send Authentication Info to the HLR (at step B150). When the HLR receives the MAP Send Authentication Info, the HLR transmits a MAP Send Authentication Info Ack to the SGSN (new) (at step B151).

When the SGSN (new) receives the MAP Send Authentication Info Ack, the SGSN (new) transmits a GMM: Authentication Request to the UE (at step B152).

When the UE receives the GMM: Authentication Request, the UE sends back a GMM: Authentication Response to the SGSN (new) (at step B153).

Thereafter, the SGSN (new) transmits an SGSN Context Acknowledge containing the IMSLUE to the PS server (old) (at step B154).

In addition, the SGSN (new) transmits a GTP: Update PDP Context Request to the GGSN (at step B155). When the GGSN receives the GTP: Update PDP Context Request, the GGSN updates communication path information and transmits a GTP: Update PDP Context Response to the SGSN (new) (at step B156).

When the SGSN (new) receives the GTP: Update PDP Context Response, the SGSN (new) transmits a MAP Update GPRS Location containing the IMSLUE to the HLR (at step B157).

When the HLR receives the MAP Update GPRS Location, the HLR transmits a MAP Cancel Location containing the IMSLUE to the PS server (old) (at step B158).

When the PS server (old) receives the MAP Cancel Location, since the subscriber information (PS) of the UE identified with the IMSLUE has been deleted, the PS server (old) simply transmits a MAP Cancel Location Ack to the HLR (at step B159).

In addition, since the PS server (old) has received the SGSN Context Acknowledge at step B154, the PS server (old) deletes the subscriber information (PS) of the UE identified with the IMSLUE, releases the resources, and transmits a Session Termination Request to the AAA (at step B160).

When the AAA receives the Session Termination Request, the AAA sends back a Session Termination Answer to the PS server (old) (at step B161).

When the PS server (old) receives the Session Termination Answer, the PS server (old) transmits an Informational Request containing the IMSLUE to the FAP (old) (at step B162).

When the FAP (old) receives the Informational Request, the FAP (old) deletes the subscriber information (PS) of the UE identified with the IMSLUE, releases the resources, and sends back an Informational Response to the PS server (old) (at step B163). As a result, IPsec Tunnel (4) is released between the FAP (old) and the PS server (old) (at step B164).

Since the HLR has received the MAP Cancel Location Ack at step B159, the HLR transmits a MAP Insert Subscriber Data containing the subscriber information of IMSLUE to the SGSN (new) (at step B165).

When the SGSN (new) receives the MAP Insert Subscriber Data, the SGSN (new) creates a subscriber profile (PS) based on the subscriber information of IMSLUE and stores the created subscriber profile (PS) as the PS-VLR. Thereafter, the SGSN (new) sends back a MAP Insert Subscriber Data Ack to the HLR (at step B166).

When the HLR receives the MAP Insert Subscriber Data Ack, the HLR transmits a MAP Update GPRS Location Ack to the SGSN (new) (at step B167).

When the SGSN (new) receives the MAP Update GPRS Location Ack, the SGSN (new) transmits a Routing Area Update Accept containing the P-TMSI to the UE (at step B168). At this point, the SGSN (new) issues the P-TMSI containing the NRI that is identification information (SGSN number) of its own SGSN (new) as the Iu-Flex function of the existing 3G network and transmits the P-TMSI to the UE.

When the UE receives the Routing Area Update Accept, the UE stores the P-TMSI in its own UE and transmits a Routing Area Update Complete to the SGSN (new) (at step B169).

As a result, after the UE performs PS handover, the PDP context is activated and thereby the UE can communicate with the device of the remote party through the handover destination Node B. Thereafter, if no communication state continues for a predetermined time, the wireless channel between the UE and the Node B is automatically released and the preservation state occurs (at step B170).

<Example of PS Handover Operation from Existing 3G Network to IMS-Femto Network>

Next, with reference to sequence diagrams shown in FIG. 11A to FIG. 15B, an example of an operation in the case in which a UE hands over a call from a Node B of the existing 3G network to an FAP of the IMS-Femto network according to this embodiment will be described.

In the following description, it is assumed that an SGSN that manages a handover source Node B to which the UE belonged is referred to as the SGSN (old); a handover destination FAP to which the UE newly belongs is referred to as the FAP (new); and a PS server that manages the FAP (new) is referred to as the PS server (new).

To activate a PDP context before a UE moves and perform PS handover, a sequence of operations is performed between the UE and the existing 3G network including the handover destination Node B: the CS position is registered (at steps C1 to C13), the PS position is registered (at steps C14 to C24), and the PS call is performed (at steps C25 to C27). Since these operations are those of the existing 3G network prescribed in the 3GPP standard, their description will be omitted.

As a result, the PDP context is activated and thereby the UE can communicate with the device of the remote party through Node B. Thereafter, if no communication state continues for a predetermined time, a RRC Disconnection automatically releases only the wireless channel between the UE and the Node B (at step C38) and then the preservation state occurs (at step C39).

After the communication connection is established based on the PDP context, when the UE moves from the Node B of the existing 3G network (Macro network) to the FAP (new) of the IMS-Femto network, the UE starts registering the CS position to the IMS-Femto network.

Since the CS position registration operation at steps C40 to C86 is the same as that at steps B1 to B44 except that the FAP (old) is substituted with the FAP (new), their description will be omitted. It is assumed that the UE starts registering the CS position at steps C40 to C86 in the state in which IPsec Tunnel (1) has been established between the FAP (new) and the PDG.

To register the PS position after the UE moves and performs handover, the UE transmits a Routing Area Update Request containing an old RAI that identifies the handover source Node B, an old P-TMSI Signature that the UE received before it moved, an NSAPI, and a PDP Context Status to the FAP (new) (at step C87).

Since the FAP (new) receives the Routing Area Update Request containing the PDP Context Status, the FAP (new) determines to successively use the PDP context and thereby transmits an address request (Request) for the PS server (new) that manages its own FAP (new) containing a default APN that has been set to its own FAP (new) to the DNS of the IMS-Femto network (at step C88).

When the DNS of the IMS-Femto network receives the address request (Request) containing the APN, the DNS sequentially sends back address information of PS servers according to the round robin scheme. In other words, the DNS transmits address information of a predetermined number of PS servers (address information of at least one PS server) and the FAP (old) successively determines whether or not the address information of a PS server can be allocated. If the address information of a PS server can be allocated, the FAP (old) is allocated to the PS server. If the address information of a PS server cannot be allocated, the DNS retransmits address information of the predetermined number of PS servers. In such a manner, the DNS sends back (answers) address information of the predetermined number of PS servers that can be allocated to the FAP (new) (at step C89).

When the FAP (new) receives the address of the PS server (new), the FAP (new) transmits an IKE-SA-INIT Request to the PS server (new) (at step C90).

When the PS server (new) receives the IKE-SA-INIT Request, the PS server (new) transmits an IKE-SA-INIT Response to the FAP (new) (at step C91).

When the FAP (new) receives the IKE-SA-INIT Response, the FAP (new) transmits an IKE-AUTH Request containing the APN and NAI (Network Access Identifier) to the PS server (new) (at step C92).

When the PS server (new) receives the IKE-AUTH Request, the PS server (new) transmits a Dia-EAP Request containing the NAI contained in the IKE-AUTH Request to the AAA (at step C93).

When the AAA receives the Dia-EAP Request, the AAA transmits a Dia-Wx-MAR containing the IMSLUE of the NAT contained in the Dia-EAP Request to the HSS (at step C94).

When the HSS receives the Dia-Wx-MAR, the HSS transmits a MAP-SAI containing the IMSLUE contained in the Dia-Wx-MAR to the HLR (at step C95). MAP-SAI is an acronym of MAP Send Authentication Info.

When the HLR receives the MAP-SAI, the HLR obtains authentication information for the IMSLUE contained in the MAP-SAI and transmits a MAP-SAI Ack containing the authentication information to the HSS (at step C96).

When the HSS receives the MAP-SAI Ack, the HSS transmits a Dia-Wx-MAA containing the authentication information for the IMSLUE contained in the MAP-SAI Ack to the AAA (at step C97).

When the AAA receives the Dia-Wx-MAA, the AAA transmits a Dia-EAP Answer containing the Result-Code (multi-round) and EAP Request/AKA-Challenge to the PS server (new) (at step C98).

When the PS server (new) receives the Dia-EAP Answer, the PS server (new) transmits an IKE-AUTH Response containing EAP Request/AKA-Challenge to the FAP (new) (at step C99).

When the FAP (new) receives the IKE-AUTH Response, the FAP (new) transmits an Authentication Request to the UE (at step C100).

When the UE receives the Authentication Request, the UE transmits an Authentication Response to the FAP (new) (at step C101).

When the FAP (new) receives the Authentication Response, since the Routing Area Update Request contains the PDP Context Status and thereby the FAP (new) has determined to successively use the PDP context at step C84, the FAP (new) transmits an IKE-AUTH Request containing the old RAI, old P-TMSI, old P-TMSI Signature, and NSAPI received in reply to the Routing Area Update Request at step C87, and new RAI, and new P-TMSI to the PS server (new) (at step C102). In this case, the new RAI is identification information with which the own device (FAP (new)) is identified. The new P-TMSI is a value issued by its own FAP (new) such that conditions prescribed in the 3GPP standard are satisfied. The NRI contained in the new P-TMSI may be any value such as a predetermined fixed value that depends on the applied design.

When the PS server (new) receives the IKE-AUTH Request, the PS server (new) transmits a Dia-EAP Request containing the EAP-Response/AKA-Challenge to the AAA (at step C103).

When the AAA receives the Dia-EAP Request, the AAA transmits a Dia-EAP Answer to the PS server (new) (at step C103). If the UE has been successfully authenticated, the AAA transmits a Dia-EAP Answer containing the Result-Code (Success) and EAP Request/Success to the PS server (new).

When the PS server (new) receives the Dia-EAP Answer, the PS server (new) transmits a Dia-AA-Request to the AAA (at step C105).

When the AAA receives the Dia-AA-Request, the AAA transmits a Dia-AA-Answer to the PS server (new) (at step C106). If the UE has been successfully authenticated, the AAA transmits a Dia-AA-Answer containing the Result-Code (Success) to the PS server (new).

In this case, the PS server (new) determines to successively use the PDP context based on the IKE-AUTH Request received from the FAP (new) at step C102. Thus, the PS server (new) transmits an address request (Request) for the handover source SGSN containing the old RAI contained in the IKE-AUTH Response received from the FAP (new) to the DNS of the existing 3G network or packet public network (at step C107).

In this case, the DNS of the existing 3G network or packet public network cannot obtain the address of the handover source SGSN from the old RAI contained in the address request. In other words, the Iu-Flex function of the existing 3G network cannot obtain the address of the SGSN (old) that manages the Node B identified with the old RAI.

Thus, when the DNS of the existing 3G network or packet public network receives an address request from the PS server (new), the DNS sends back (answers) the address of the representative SGSN of the existing 3G network according to a technique based on the 3GPP standard (at step C108).

When the PS server (new) receives the address from the DNS, the PS server (new) transmits an SGSN Context Request to the address so as to cause the SGSN to successively use the PDP context (at step C109). Since the PS server (new) has received the address of the representative SGSN as the address of the handover source SGSN, the PS server (new) transmits an SGSN Context Request containing the IMSLUE, old RAI, old P-TMSI, and old P-TMSI Signature to the address of the representative SGSN.

When the representative SGSN receives the SGSN Context Request, the representative SGSN obtains the NRI from the old P-TMSI contained in the SGSN Context Request using the Iu-Flex function prescribed in the 3GPP technical specifications and determines that the SGSN identified with the NRI is the handover source SGSN (old).

The representative SGSN forwards the SGSN Context Request received from the PS server (new) to the address of the SGSN (old) identified according to a technique based on the 3GPP standard (at step C110).

When the SGSN (old) receives the SGSN Context Request, the SGSN (old) performs a simple authentication process prescribed in the 3GPP standard based on the IMSLUE and authentication information of old P-TMSI Signature contained in the SGSN Context Request.

If the authentication information used in the IMS-Femto network is not the same as that used in the existing 3G network, the result of the simple authentication becomes NG. In other words, unless the IMS-Femto network is configured such that all information used in the simple authentication process such as authentication information is the same, the result of the simple authentication process becomes NG.

If the result of the simple authentication process is NG, the SGSN (old) transmits an SGSN Context Response containing a Cause #206 P-TMSI Signature Mismatch to the PS server (new) (at step C111).

When the PS server (new) receives the SGSN Context Request containing the Cause #206 P-TMSI Signature Mismatch, the PS server (new) transmits an SGSN Context Request containing the IMSLUE, old RAI, old P-TMSI, and MS Validated=Yes to the SGSN (old) and requests that the PS (new) be able to successively use the PDP context without performing the normal authentication process (at step C112).

When the SGSN (old) receives the SGSN Context Request containing MS Validated=Yes, the SGSN (old) searches the subscriber profile of the PS-VLR for configuration information of the PDP context based on the IMSLUE, old RAI, and old P-TMSI contained in the SGSN Context Request so as to identify the configuration information of the PDP context based on the IMSLUE. The SGSN (old) transmits an SGSN Context Response containing the configuration information of the identified PDP context, Cause #128 Request Accepted, and NSAPI received from the FAP (old) to the PS server (new) such that the PS server (new) successively uses the PDP context (at step C113). The configuration information of the PDP context contains at least an MM context, a PDP context, an IMSI_UE, and an SGSN address prescribed in the 3GPP standard.

When the PS server (new) receives the SGSN Context Response containing the Cause #128 Request Accepted, the PS server (new) performs an NSAPI check that compares the NSAPI obtained in reply to the SGSN Context Response with the NSAPI contained in the IKE-AUTH Request received from the FAP (new) at step C102. If they match, the SGSN (new) determines that the result of the NSAPI check is OK and successively uses the PDP context based on the configuration information of the PDP context contained in the received SGSN Context Response in the same manner as that in the existing 3G network.

Thereafter, the PS server (new) sends back an SGSN Context Acknowledge containing the IMSLUE to the SGSN (old) (at step C114).

In addition, the PS server (new) transmits a GTP: Update PDP Context Request to the GGSN (at step C115). When the GGSN receives the GTP: Update PDP Context Request, the GGSN updates communication path information and transmits a GTP: Update PDP Context Response to the PS server (new) (at step C116).

When the PS server (new) receives the GTP: Update PDP Context Response, the PS server (new) transmits a MAP Update GPRS Location containing the IMSLUE to the HLR (at step C117).

When the HLR receives the MAP Update GPRS Location, the HLR transmits a MAP Cancel Location containing the IMSLUE to the SGSN (old) (at step C118).

When the SGSN (old) receives the MAP Cancel Location, the SGSN (old) deletes the subscriber information (PS) of the UE identified with the IMSLUE and transmits a MAP Cancel Location Ack to the HLR (at step C119).

When the HLR receives the MAP Cancel Location Ack, the HLR transmits a MAP Insert Subscriber Data containing the subscriber information of IMSLUE to the PS server (new) (at step C120).

When the PS server (new) receives the MAP Insert Subscriber Data, the PS server (new) creates a subscriber profile (PS) based on the subscriber information of IMSLUE and stores it as the PS-VLR. Thereafter, the PS server (new) sends back a MAP Insert Subscriber Data Ack to the HLR (at step C121).

When the HLR receives the MAP Insert Subscriber Data Ack, the HLR transmits a MAP Update GPRS Location Ack to the PS server (new) (at step C122).

When the PS server (new) receives the MAP Update GPRS Location Ack, the PS server (new) transmits an IKE-AUTH Response containing the EAP Request/Success to the FAP (new) (at step C123).

When the FAP (new) receives the IKE-AUTH Response, the FAP (new) transmits a Security Mode Command to the UE (at step C124).

When the UE receives Security Mode Command, the UE transmits a Security Mode Complete to the FAP (new) (at step C125).

When the FAP (new) receives the Security Mode Complete, the FAP (new) performs a 3G wireless encryption process and transmits an IKE-AUTH Request to the PS server (new) (at step C126). The FAP (new) performs the 3G wireless encryption process according to a technique based on the 3GPP standard.

When the PS server (new) receives the IKE-AUTH Request, the PS server (new) transmits an IKE-AUTH Response to the FAP (new) (at step C127).

When the FAP (new) receives the IKE-AUTH Response, IPsec Tunnel (4) is established between the FAP (new) and the PS server (new) (at step C128). Thereafter, the FAP (new) transmits a Routing Area Update Accept containing the P-TMSI to the UE (at step C129). The P-TMSI contained in the Routing Area Update Accept is issued by the FAP (new) to the UE and needs to satisfy the conditions prescribed in the 3GPP standard. In other words, the NRI contained in the P-TMSI may be any value such as a predetermined fixed value that depends on the applied design.

When the UE receives the Routing Area Update Accept, the UE stores the P-TMSI in its own UE and transmits a Routing Area Update Complete to the FAP (new) (at step C130).

When the FAP (new) receives the Routing Area Update Complete, the FAP (new) transmits a set of P-TMSI. RAI of its own FAP (new), IMSI_UE, and address information of the PS server (new) to the DB device of the IMS-Femto network and registers the set of information to the database of the DB device (at step C131). The P-TMSI transmitted to the DB device is issued by the FAP (new) to the UE at step C129.

When the DB device of the IMS-Femto network receives the set of P-TMSI, RAI, IMSI_UE, and address information of the PS server (new) as registration information, the DB device correlates the P-TMSI, RAI, IMSI_UE, and address information of the PS server (new) and stores the correlated data as a database.

The registration operation to the DB device at step C131 may not be performed at the foregoing timing, but at any predetermined timing after the FAP (new) receives the address information of the PS server (new) from the DNS of the IMS-Femto network and communicates with the PS server (new) until the PDP context is activated.

In the foregoing example, when the FAP (new) transmits the Routing Area Update Accept to the UE at step C129, the FAP (new) issues the P-TMSI. If the registration operation to the DB device is performed before step C129, the FAP (new) may issue the P-TMSI and then transmit the Routing Area Update Accept containing the P-TMSI to the UE at step C129.

The registration operation to the DB device at step C131 is not limited to an operation in which the FAP (new) transmits a registration request to the DB device. Alternatively, after the FAP (new) transmits registration information to the PS server (new), the PS server (new) may transmit a registration request to the DB device.

In this case, the PS server (new) may transmit a registration request to the DB device at any predetermined timing after the FAP (new) receives address information of the PS server (new) from the DNS of the IMS-Femto network and communicates with the PS server (new), the FAP (new) transmits registration information containing address information of the PS server (new), P-TMSI, RAI, and IMSI_UE to the PS server (new) until the PDP context is activated.

If the FAP (new) transmits the registration information to the PS server (new) before step C129, the FAP (new) may issue the P-TMSI and then transmit the Routing Area Update Accept containing the P-TMSI to the UE at step C129.

Alternatively, the FAP (new) may transmit the P-TMSI, RAI, and IMSI_UE to the PS server (new) and the PS server (new) may transmit registration information in which the received information contains address information of its own PS server (new) to the DB device at any predetermined timing until the PDP context is activated.

In this case, if the FAP (new) transmits the P-TMSI, RAI and IMSI_UE to the PS server (new) before step C129, the FAP (new) may issue the P-TMSI and then transmit the Routing Area Update Accept containing the P-TMSI to the UE at step C129.

It is preferred that the registration information transmitted from the FAP (new) to the PS server (new) be at least partly contained in a signal transmitted at any one of steps C90, C92, C102, and C126.

As a result, after the UE performs PS handover, the PDP context is activated and thereby the UE can communicate with the device of the remote party through the handover destination FAP (new). Thereafter, if no communication state continues for a predetermined time, the wireless channel between the UE and the FAP (new) is automatically released and the preservation state occurs (at step C132).

Effects of Embodiment

As described above, when PS handover is performed in the IMS-Femto network according to the embodiment of the present invention, the PDP context can be successively used. Thus, PS handover can be performed between the IMS-Femto network and the existing mobile communication network such as existing 3G network in the same manner as that performed in the existing 3G network.

More specifically, when PS handover is performed from the IMS-Femto network according to this embodiment to the existing 3G network, before the UE moves, the FAP (old) or the PS server (old) transmits a set of P-TMSI, RAI of the own device, IMSI_UE, and address information of the PS server (old) to the DB device of the IMS-Femto network so as to register the set of information to the database of the DB device.

After the UE moves, the representative PS server that has received the SGSN Context Request at step B145 and then transmits an address request for the handover source PS server (old) containing at least the P-TMSI contained in the SGSN Context Request to the DB device. The DB device searches the database for address information of the PS server (old) with a key of at least the P-TMSI and transmits the address information of the obtained PS server (old) to the representative PS server.

Thus, the representative PS server can obtain the address information of the handover source PS server (old) and forwards the received SGSN Context Request to the address of the identified PS server (old). As a result, the PDP context can be successively used by PS handover between the IMS-Femto network and the existing 3G network in the same manner as that performed in the existing 3G network.

When PS handover is performed from the existing 3G network to the IMS-Femto network according to this embodiment, the handover destination PS server (new) transmits the SGSN Context Request containing the old P-TMSI that contains identification information (NRI) that identifies the handover source SGSN (old) using the Iu-Flex function according to the 3GPP technical specifications to the representative SGSN of the existing 3G network that contains the handover source SGSN at step C109.

As a result, the SGSN Context Request can be forwarded from the representative SGSN of the existing 3G network to the handover source SGSN in the same manner as that performed in the existing 3G network. Thus, the PDP context can be successively used by PS handover performed between the IMS-Femto network and the existing 3G network in the same manner as that performed in the existing 3G network.

According to this embodiment, since the PDP context is successively used as described above, PS handover can be performed between the IMS-Femto network and the existing 3G network in the same manner as that performed in the existing 3G network without having to reactivate the PDP context at the PS handover destination SGSN.

Thus, even if PS handover is performed during packet communication or in the preservation state where no communication state continues for a predetermined time in the packet communication state, the packet communication can be continued in the same manner as that performed in the existing 3G network.

In addition, according to this embodiment, since a PS server virtually configures an SGSN function section, signals can be transmitted and received between the IMS-Femto network and a device that belongs a network other than the IMS-Femto network (for example, an SGSN of the existing 3G network) in the same manner as those between SGSNs of the existing 3G network. Thus, according to this embodiment, a network other than the IMS-Femto network such as the existing 3G network recognizes a PS server to be an SGSN such that the PDP context can be successively used by PS handover using signals transmitted and received as prescribed in the applied standards such as 3GPP TS 23.236.

Thus, the foregoing effects can be obtained without having to modify individual devices of the existing mobile communication network such as the existing 3G network.

In the foregoing, PS handover performed between the existing 3G network and the IMS-Femto network was described. The SGSN function section of a PS server of the IMS-Femto network is recognized as an SGSN by a device that belongs to a network other than the IMS-Femto network. Thus, a PS server of the IMS-Femto network is identified as an SGSN of the existing 3G network by any one of a various types of mobile communication networks such as an LTE network. As a result, when PS handover is performed between any one of various types of mobile communication networks such as an LTE network and the IMS-Femto network, the PDP context can be successively used according to a process as prescribed in standards such as 3GPP standard like the foregoing embodiment.

Since the foregoing embodiment is just a preferred embodiment of the present invention, the present invention can be modified in various manners based on the spirit of the present invention.

For example, Non-Patent Literature 1 presented in this specification is just an example. Thus, the communication system according to this embodiment can not be realized not based on the version of the 3GPP standard described in Non-Patent Literature 1.

In addition, the foregoing embodiment describes that a UE moves in the preservation state. Instead, as a series of handover operations are performed, the wireless channel between a UE and an FAP or a Node B is released regardless of whether or not the preservation state occurs when the UE moves. In other words, when PS handover is performed as the UE moves after the PS communication is established, each function of the foregoing embodiment can be realized regardless of which or not the preservation state occurs.

In the foregoing embodiment, an example of configuration in which a PS server realizes the SGSN function section was described. As long as the function can be realized, the device that realizes the function is not limited to a PS server. Instead, even if another device such as a PDG operates as a service control device that has the SGSN function section of the foregoing embodiment, the present invention can be similarly realized.

In the foregoing embodiment, an example of configuration in which DB device 9 is realized as a single device was described. As long as the function of DB device 9 can be realized, the device that implements the function is not limited to DB device 9. For example, even if any device such as DNS 7 of the IMS-Femto network has a database function of DB device 9, the present invention can be realized likewise.

Thus, as long as the function of each device of the foregoing embodiment can be realized, a device that implements the function may not be limited to the foregoing embodiment. Instead, even if other device implements such functions, the present invention can be realized likewise.

In other words, each device and each system described in this specification is a logical set of function sections (function modules and devices) that realizes individual functions regardless of whether or not the individual function sections are provided in a device or provided in a single housing.

The control operation of each device that configures the communication system according to the foregoing embodiment can be executed by hardware, software, or a hybrid configuration of the both.

When a process is executed by software, a program that codes a process sequence can be installed in memory provided in a computer that is built in dedicated hardware and executed. Alternatively, the program may be installed in a general purpose computer that can execute various processes and executed.

For example, the program can be pre-recorded on a hard disk or a ROM (Read Only Memory) as a record medium. Alternatively, the program can be temporarily or permanently stored (recorded) on a removable record medium. Such a removable record medium can be provided as so-called package software. Examples of the removable record medium include floppy (registered trademark) disk, CD-ROM (Compact Disc Read Only Memory), MO (Magneto Optical) disc, DVD (Digital Versatile Disc), magnetic disc, and semiconductor memory.

The program is installed from the foregoing removable record medium to the computer. Alternatively, the program may be wirelessly transferred from a download site to the computer. Further alternatively, the program may be wired to the computer through a network.

In the communication system according to the foregoing embodiment, processes may be executed in time series as described in the foregoing embodiment. Alternatively, processes may be executed in parallel or discretely when necessary or depending on the capability of the device that executes the processes.

In addition, the communication system according to the foregoing embodiment may be composed of a logical set of a plurality of devices. Alternatively, the communication system according to the foregoing embodiment may be accommodated in a single housing.

With reference to the embodiments, the present invention has been described. However, it should be understood by those skilled in the art that the structure and details of the present invention may be changed in various manners without departing from the scope of the present invention.

The present application claims priority based on Japanese Patent Application JP 2011-203628 filed on Sep. 16, 2011, the entire contents of which are incorporated herein by reference in its entirety.

The invention claimed is:

1. A communication system that configures an IMS (IP Multimedia Subsystem) network, comprising:
    a femtocell base station;
    a service control device;
    a core device that controls a call; and
    a database device,
    wherein said service control device has an SGSN (Serving GPRS Support Node) function section that sends back a signal transmitted from a network that uses a communication procedure different from that of the IMS network in the same manner as a signal transmitted from an SGSN, a plurality of service control devices being provided in said IMS network,
    wherein one of the plurality of service control devices has been designated as a representative service control device,
    wherein said database device comprises:
    storage that correlatively stores a P-TMSI (Packet-Temporary Mobile Subscriber Identity) issued to a UE (User Equipment) and address information of a service control device that manages a femtocell base station to which the UE belongs;
    a search device that searches said storage for address information correlated with the P-TMSI received from said representative service control device; and
    address transmitter that transmits the address information for which said search device has searched said storage to said representative service control device, and
    wherein said service control device comprises:
    request transmitter that is used as said representative service control device and transmits a P-TMSI contained in a PDP (Packet Data Protocol) context succession request signal received according to a handover communication procedure prescribed in an applicable standard as an address request to said database device; and
    forward controller that is used as said representative service control device and that forwards the PDP context succession request signal received by said request transmitter to an address represented by address information of the service control device received from said database device,
    wherein said service control device comprises:
    first registration request device that transmits the P-TMSI received from the femtocell base station that belongs to its own service control device and the address information of its own service control device as a registration request to said database device,
    wherein said first registration request device transmits the registration request to said database device after the first registration request device receives the P-TMSI from the femtocell base station that belongs to its own service control device until the PDP context is activated.

2. A communication system that configures an IMS (IP Multimedia Subsystem) network, comprising:
    a femtocell base station;
    a service control device;
    a core device that controls a call; and
    a database device,
    wherein said service control device has an SGSN (Serving GPRS Support Node) function section that sends back a signal transmitted from a network that uses a communication procedure different from that of the IMS network in the same manner as a signal transmitted from an SGSN, a plurality of service control devices being provided in said IMS network, wherein one of the plurality of service control devices has been designated as a representative service control device, wherein said database device comprises:

storage that correlatively stores a P-TMSI (Packet-Temporary Mobile Subscriber Identity) issued to a UE (User Equipment) and address information of a service control device that manages a femtocell base station to which the UE belongs;

a search device that searches said storage for address information correlated with the P-TMSI received from said representative service control device; and address transmitter that transmits the address information for which said search device has searched said storage to said representative service control device, and wherein said service control device comprises:

request transmitter that is used as said representative service control device and transmits a P-TMSI contained in a PDP (Packet Data Protocol) context succession request signal received according to a handover communication procedure prescribed in an applicable standard as an address request to said database device; and forward controller that is used as said representative service control device and that forwards the PDP context succession request signal received by said request transmitter to an address represented by address information of the service control device received from said database device, wherein said femtocell base station comprises:

issuance device that issues a P-TMSI to said UE; and second registration request device that transmits the P-TMSI issued by said issuance device and the received address information of the service control device that manages its own femtocell base station as a registration request to said database device, wherein said second registration request device transmits the registration request to said database device after said second registration device receives the address information of the service control device that manages its own femtocell base station until the PDP context is activated.

3. A service control device used for an IMS (IP Multimedia Subsystem) network, said IMS network comprising:

a femtocell base station;

said service control device;

a core device that controls a call; and a database device, wherein said service control device has an SGSN (Serving GPRS Support Node) function section, the SGSN function section sends back a signal transmitted from a network that uses a communication procedure different from that of the IMS network in the same manner as a signal transmitted from an SGSN, a plurality of service control devices being provided in said IMS network, wherein one of the plurality of service control devices has been designated as a representative service control device, wherein said database device comprises:

storage that correlatively stores a P-TMSI (Packet-Temporary Mobile Subscriber Identity) issued to a UE (User Equipment) and address information of a service control device that manages a femtocell base station to which the UE belongs;

a search device that searches said storage for address information correlated with the P-TMSI received from said representative service control device; and address transmitter that transmits the address information for which said search device has searched said storage to said representative service control device, and wherein said service control device comprises:

request transmitter that is used as said representative service control device and transmits a P-TMSI contained in a PDP (Packet Data Protocol) context succession request signal received according to a handover communication procedure prescribed in an applicable standard as an address request to said database device; and forward controller that is used as said representative service control device and that forwards the PDP context succession request signal received by said request transmitter to an address represented by address information of the service control device received from said database device, first registration request device that transmits the P-TMSI received from the femtocell base station that belongs to its own service control device and the address information of the own device as a registration request to said database device, wherein said storage correlatively stores the P-TMSI and the address information of the service control device received as a registration request, wherein said first registration request device transmits the registration request to said database device after the first registration request device receives the P-TMSI from the femtocell base station that belongs to its own service control device until the PDP context is activated.

4. A femtocell base station used for an IMS (IP Multimedia Subsystem) network, said IMS network comprising:

said femtocell base station;

a service control device;

a core device that controls a call; and a database device, wherein said service control device has an SGSN (Serving GPRS Support Node) function section that sends back a signal transmitted from a network that uses a communication procedure different from that of the IMS network in the same manner as a signal transmitted from an SGSN, a plurality of service control devices being provided in said IMS network, wherein one of the plurality of service control devices has been designated as a representative service control device, wherein said database device comprises:

storage that correlatively stores a P-TMSI (Packet-Temporary Mobile Subscriber Identity) issued to a UE (User Equipment) and address information of a service control device that manages a femtocell base station to which the UE belongs;

a search device that searches said storage for address information correlated with the P-TMSI received from said representative service control device; and address transmitter that transmits the address information for which said search device has searched said storage to said representative service control device, and wherein said femtocell base station comprises:

issuance device that issues a P-TMSI to said UE;

second registration request device that transmits the P-TMSI issued by said issuance device and the received address information of the service control device that manages its own femtocell base station as a registration request to said database device, wherein said second registration request device transmits the registration request to said database device after said second registration device receives the address information of the service control device that manages its own femtocell base station until the PDP context is activated.

5. A communication method for a communication system that configures an IMS (IP Multimedia Subsystem) network, wherein said IMS network comprises:
a femtocell base station;
a service control device;
a core device that controls a call; and
a database device,
wherein said service control device has an SGSN (Serving GPRS Support Node) function section that sends back a signal transmitted from a network that uses a communication procedure different from that of the IMS network in the same manner as a signal transmitted from an SGSN, a plurality of service control devices being provided in said IMS network,
wherein one of the plurality of service control devices has been designated as a representative service control device,
wherein said communication method comprises:
a storage step that correlatively stores a P-TMSI (Packet-Temporary Mobile Subscriber Identity) issued to a UE (User Equipment) and address information of a service control device that manages a femtocell base station to which the UE belongs;
a request transmission step that transmits a P-TMSI contained in a PDP (Packet Data Protocol) context succession request signal received by said representative service control device according to a handover communication procedure prescribed in an applicable standard as an address request to said database device;
a search step that searches said database device for address information correlated with the P-TMSI that the database device receives from said representative service control device;
an address transmission step that causes said database device to transmit the address information for which said search device has searched said storage at said search step to said representative service control device; and
a forward control step that forwards the PDP context succession request signal received by said representative service control device at said request transmission step to an address represented by address information of the service control device received from said database device,
first registration request step that transmits the P-TMSI received from the femtocell base station that belongs to its own service control device by said service control device and the address information of its own service control device as a registration request to said database device, said first registration request step being followed by said storage step,
wherein said first registration request step is performed by transmitting the registration request to said database device after said service control device receives the P-TMSI from the femtocell base station that belongs to its own service control device until the PDP context is activated.

6. A communication method for a communication system that configures an IMS (IP Multimedia Subsystem) network, wherein said IMS network comprises:
a femtocell base station;
a service control device;
a core device that controls a call; and
a database device,
wherein said service control device has an SGSN (Serving GPRS Support Node) function section that sends back a signal transmitted from a network that uses a communication procedure different from that of the IMS network in the same manner as a signal transmitted from an SGSN, a plurality of service control devices being provided in said IMS network,
wherein one of the plurality of service control devices has been designated as a representative service control device,
wherein said communication method comprises:
a storage step that correlatively stores a P-TMSI (Packet-Temporary Mobile Subscriber Identity) issued to a UE (User Equipment) and address information of a service control device that manages a femtocell base station to which the UE belongs;
a request transmission step that transmits a P-TMSI contained in a PDP (Packet Data Protocol) context succession request signal received by said representative service control device according to a handover communication procedure prescribed in an applicable standard as an address request to said database device;
a search step that searches said database device for address information correlated with the P-TMSI that the database device receives from said representative service control device;
an address transmission step that causes said database device to transmit the address information for which said search device has searched said storage at said search step to said representative service control device; and
a forward control step that forwards the PDP context succession request signal received by said representative service control device at said request transmission step to an address represented by address information of the service control device received from said database device,
issuance step that causes said femtocell base station to issue a P-TMSI to said UE; and
second registration request step that transmits the P-TMSI issued at said issuance step and the address information of the service control device that manages its own femtocell base station as a registration request to said database device, the address information being received by said femtocell base station,
wherein said issuance step and said second registration request step are followed by said storage,
wherein said second registration request step is performed by transmitting the registration request to said database device after said femtocell base station receives the address information of the service control device that manages its own femtocell base station until the PDP context is activated.

7. The communication system as set forth in claim 1,
wherein said storage correlatively stores the P-TMSI and the address information of the service control device received as a registration request.

8. The communication system as set forth in claim 2,
wherein said storage correlatively stores the P-TMSI and the address information of the service control device received as a registration request.

9. The communication method as set forth in claim 5, wherein said storage step is performed by correlatively storing the P-TMSI and the address information of the service control device received as a registration request by said database device.

10. The communication method as set forth in claim 6, wherein said storage step is performed by correlatively storing the P-TMSI and the address information of the service control device received as a registration request by said database device.

* * * * *